(12) United States Patent
Wu et al.

(10) Patent No.: US 9,910,563 B2
(45) Date of Patent: Mar. 6, 2018

(54) CONTEXTUALLY CHANGING OMNI-DIRECTIONAL NAVIGATION MECHANISM

(71) Applicant: Visual Supply Company, Oakland, CA (US)

(72) Inventors: Wayne Kong Wu, New York City, NY (US); Grant Thomas Heinlein, San Francisco, CA (US); Charles Fredrik Gruber, New York City, NY (US); Hae Jin Shim, Cresskill, NJ (US); Isaac Joel Daniels, Oakland, CA (US); Joakim Carl Tobias Jansson, New York, NY (US); Joyce Kim, New York City, NY (US)

(73) Assignee: Visual Supply Company, Oakland, CA (US)

( * ) Notice: Subject to any disclaimer, the term of this patent is extended or adjusted under 35 U.S.C. 154(b) by 0 days.

(21) Appl. No.: 15/010,687

(22) Filed: Jan. 29, 2016

(65) Prior Publication Data

US 2017/0220215 A1    Aug. 3, 2017

(51) Int. Cl.
| | | |
|---|---|---|
| *G06F 3/0483* | (2013.01) | |
| *G06F 3/0488* | (2013.01) | |
| *G06F 3/0484* | (2013.01) | |
| *G06F 3/0481* | (2013.01) | |
| *G06F 3/0482* | (2013.01) | |

(52) U.S. Cl.
CPC .......... *G06F 3/0483* (2013.01); *G06F 3/0482* (2013.01); *G06F 3/04817* (2013.01); *G06F 3/04845* (2013.01); *G06F 3/04886* (2013.01)

(58) Field of Classification Search
None
See application file for complete search history.

(56) References Cited

U.S. PATENT DOCUMENTS

| | | | |
|---|---|---|---|
| 5,760,773 A * | 6/1998 | Berman | ................ G06F 1/1626 345/672 |
| 6,515,687 B1 | 2/2003 | Wynn | |
| 7,116,340 B2 | 10/2006 | Van Liere | |
| 8,408,997 B2 | 4/2013 | Miyagawa et al. | |

(Continued)

OTHER PUBLICATIONS

"U.S. Appl. No. 15/010,513, Non Final Office Action dated Jun. 3, 2016", 12 pgs.

(Continued)

*Primary Examiner* — Amy M Levy
(74) *Attorney, Agent, or Firm* — Schwegman Lundberg & Woessner, P.A.

(57) ABSTRACT

Systems and methods for menuless application navigation are provided. In example embodiments, a first user input received via an interface of the device is detected. It is determined that the first user input is within an input region on the interface of the device. In response to determining that the first user input is within the input region, the first user input is translated into a navigation action. A second user input received via the interface of the device is detected, and it is determined that the second user input is outside the input region on the interface of the device. In response to determining that the second user input is outside the input region, the user input is translated into a second action, which is different from the navigation action.

20 Claims, 23 Drawing Sheets

(56) References Cited

U.S. PATENT DOCUMENTS

| | | | |
|---|---|---|---|
| 8,533,629 B2 | 9/2013 | Russo | |
| 8,593,420 B1* | 11/2013 | Buuck | G06F 3/041 |
| | | | 345/173 |
| 8,965,579 B2 | 2/2015 | Wang et al. | |
| 2002/0027571 A1 | 3/2002 | Matthews, III et al. | |
| 2003/0013959 A1* | 1/2003 | Grunwald | A61B 8/469 |
| | | | 600/437 |
| 2004/0130525 A1 | 7/2004 | Suchocki | |
| 2006/0070007 A1* | 3/2006 | Cummins | G06F 17/30398 |
| | | | 715/769 |
| 2007/0192731 A1* | 8/2007 | Townsend | G06F 3/0488 |
| | | | 715/788 |
| 2008/0309626 A1* | 12/2008 | Westerman | G06F 3/0485 |
| | | | 345/173 |
| 2010/0088654 A1* | 4/2010 | Henhoeffer | G06F 3/04883 |
| | | | 715/863 |
| 2010/0095240 A1* | 4/2010 | Shiplacoff | G06F 3/0483 |
| | | | 715/784 |
| 2010/0156813 A1* | 6/2010 | Duarte | G06F 3/0488 |
| | | | 345/173 |
| 2010/0229130 A1* | 9/2010 | Edge | G06F 3/04883 |
| | | | 715/863 |
| 2011/0035700 A1* | 2/2011 | Meaney | G06F 3/048 |
| | | | 715/784 |
| 2011/0167380 A1 | 7/2011 | Stallings et al. | |
| 2011/0285636 A1 | 11/2011 | Howard | |
| 2012/0169610 A1* | 7/2012 | Berkes | G06F 3/04883 |
| | | | 345/173 |
| 2012/0313977 A1 | 12/2012 | Kwon | |
| 2013/0024806 A1* | 1/2013 | Funabashi | G06F 3/04886 |
| | | | 715/781 |
| 2014/0098038 A1 | 4/2014 | Paek et al. | |
| 2014/0125589 A1* | 5/2014 | Kim | G06F 3/033 |
| | | | 345/157 |
| 2014/0195905 A1 | 7/2014 | Dodge | |
| 2015/0103001 A1* | 4/2015 | Li | G06F 3/0486 |
| | | | 345/157 |

OTHER PUBLICATIONS

"U.S. Appl. No. 15/010,513, Response filed Aug. 10, 2016 to Non Final Office Action dated Jun. 3, 2016", 10 pgs.

Nudelman, Greg, "C-Swipe: An Ergonomic Solution to Navigation Fragmentation on Android", Smashing Magazine, (Mar. 25, 2013), 17 pgs.

QT, Alex, "Unity 3D Virtual Joystik", [Online]. [Archived Jan. 4, 2016]. Retrieved from the Internet: <URL: https://web.archive.org/web/20160104232753/https://hdconvert.com/unity3d/multijoy.html>, (Archived: Jan. 4, 2016), 3 pgs.

"U.S. Appl. No. 15/010,513, Examiner Interview Summary dated Nov. 1, 2016", 3 pgs.

"U.S. Appl. No. 15/010,513, Final Office Action dated Sep. 23, 2016", 15 pgs.

"U.S. Appl. No. 15/010,513, Response filed Dec. 19, 2016 to Final Office Action dated Sep. 23, 2016", 10 pgs.

"IPhone 6 Plus—GTA San Andreas Gameplay", TechCloud. YouTube. YouTube, [Online] retrieved from the internet: <https://www.youtube.com/watch?v=CtkkmqfXPhM>, (Sep. 27, 2014, Web. Aug. 29, 2016).

* cited by examiner

CONTEXTUALLY CHANGING OMNI-DIRECTIONAL NAVIGATION MECHANISM

TECHNICAL FIELD

Embodiments of the present disclosure relate generally to user interface technology and, more particularly, but not by way of limitation, to content navigation systems for mobile or wearable device applications.

BACKGROUND

Many applications require a navigation mechanism in order to transition from one page of the application to another. Current application navigation systems require user gestures, such as swiping or double-tapping, to be reserved for navigation between pages. Therefore, such gestures cannot be used for other purposes within the application.

Furthermore, navigation mechanisms often lack an efficient method to denote which content page a user is currently viewing, while reserving a sufficient amount of space on the screen to display content. Including a page title at the top of a content page takes up screen space, which cannot be used for other purposes within the application.

BRIEF DESCRIPTION OF THE DRAWINGS

Various ones of the appended drawings merely illustrate example embodiments of the present disclosure and should not be considered as limiting its scope.

Figure 1:
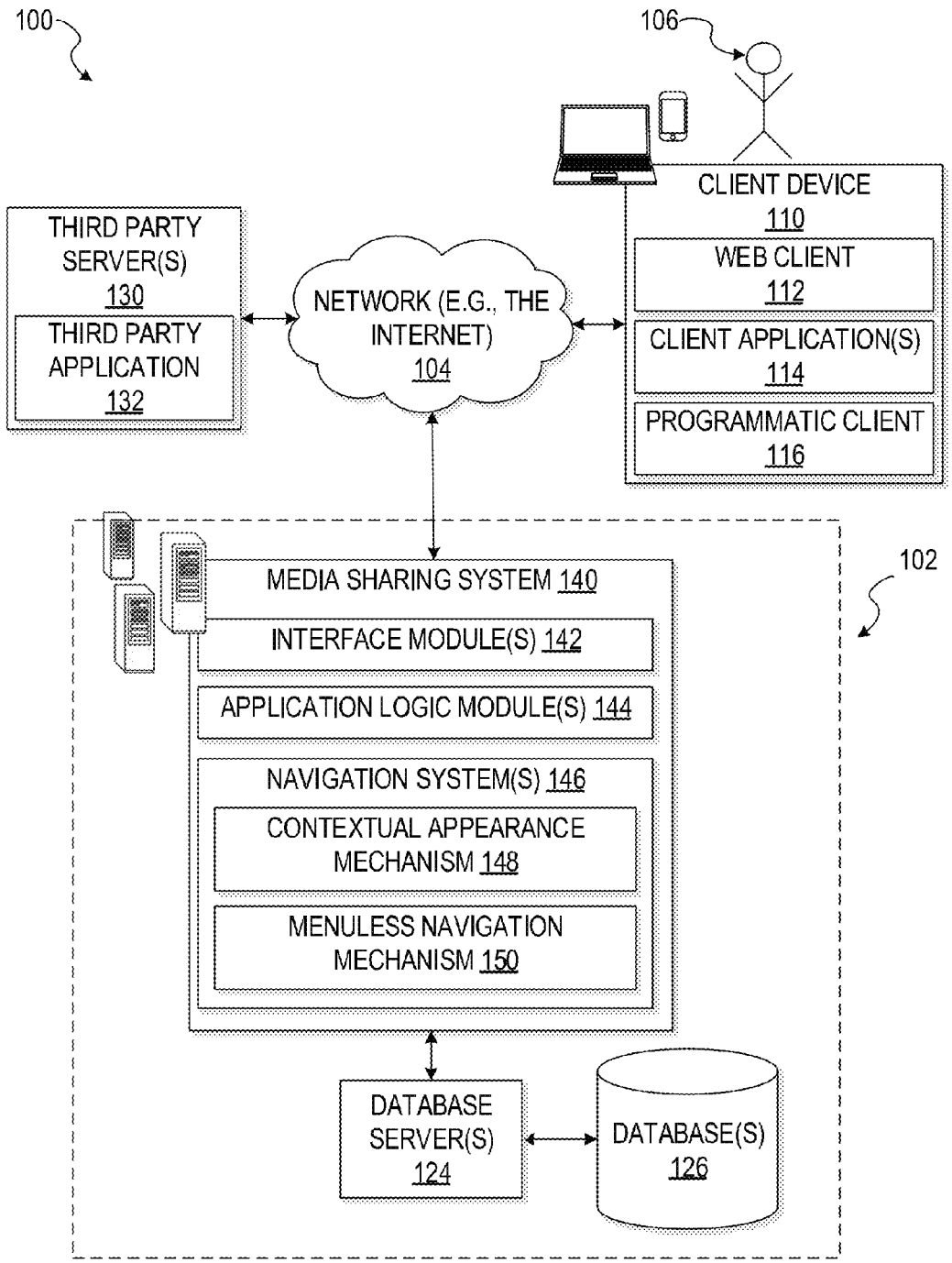
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Many of today's applications (e.g., for use on devices including mobile devices, wearable devices, and computers) contain features that are located on separate content pages within the application. Therefore, such applications require a mechanism to navigate from one content page to another so that a user can access all of the features of the application. Screen size is limited, so it may be difficult for a user to navigate through an application through a traditional menu, especially when a user is accessing the application through a portable device such as a smartphone or a wearable device. Moreover, especially for devices with small screens, applications can include much more functionality if developers can use user gestures such as swiping or double-tapping to interact with the application's features, rather than reserving such gestures for use in navigating through a menu.

To assist a user in navigating between separate content pages, in various embodiments, a navigation mechanism (e.g., a virtual joystick or a virtual trackball) is generated and displayed as an icon overlaid on content on a page of an application. For example, a navigation icon (e.g., an image file) stored locally on a device or accessed remotely through the use of one or more servers is displayed on the screen of a user device. The navigation mechanism detects a user input through the use of one or more sensors or buttons. For example, detecting a user input includes detecting one or more buttons being pressed or detecting a gesture using a capacitive touch screen of a device. When the user interacts with the input interface (e.g., a screen) of a device through a user input, and the user input is in the location of the navigation mechanism, the user input causes the application to navigate from one content page to another content page.

In various embodiments, navigation through the navigation mechanism replaces the use of a traditional menu. In response to detecting a user input, the navigation mechanism compares the user input to a predetermined list of user inputs to determine an action corresponding to the user input. In some embodiments, the action taken by the navigation mechanism in response to detecting a user input depends on the location of the detected input within the device's input interface (e.g., the screen). For example, a user input within a specific input region will be interpreted as navigating through a menu, while reserving the remaining screen space outside of the input region for other functionality. Therefore, unless the user input originates in or near the position of the navigation mechanism, the user input will not be interpreted as navigating from one content page within an application to another content page within the application. Thus, a user input in a location other than the position of the navigation mechanism can be used to interact with the application in a different way.

In one example embodiment, double-tapping on the navigation mechanism is used to return to the home page of the application, while double-tapping in another part of a device's screen will cause the application to zoom in. In another example, swiping left using the navigation mechanism is used to navigate from a user's content feed to the user's multimedia content editing screen, while swiping horizontally anywhere else on the screen is used to scroll horizontally within the user's content feed. In yet another example, swiping downward using the navigation mechanism is used to navigate to a search function screen, while swiping downward anywhere else on the screen is used to lower the volume of the application. Furthermore, in some embodiments, the action taken by the navigation mechanism in response to detecting a user input depends on the content page being displayed on the input interface (e.g., the screen) of the device prior to the navigation mechanism receiving the user input. For example, a double tap outside of the navigation mechanism area detected while a user is viewing an application feature purchase page corresponds to the action of purchasing an application feature (e.g., a set of filters used to modify an image or a video), while a double tap detected outside of the navigation mechanism area while the user is viewing a content feed corresponds to the action of saving a picture to the user's favorites.

In further embodiments, the navigation mechanism is displayed as an icon which changes appearance contextually, based on the current content page being displayed on a device. For example, each content page within the application has a contextual icon appearance. This allows a user to instantly know which content page they are viewing, based on the icon appearance. In some embodiments, the icon is stored within one or more databases as a base shape image (e.g., a plain circle) that changes in appearance based on the current content page without changing the base shape image of the icon. In one example where the icon is a circle, when a user navigates between content pages, the circle changes in hue, shading, pattern, texture, transparency, saturation, or the like. In further examples, images with various shapes are stored within one or more databases and accessed by the navigation mechanism so that the shape of the icon changes based on the current content page a user is viewing (e.g., the icon is depicted as a square when the user is viewing their own profile, while the icon is depicted as a triangle when the user is viewing another user's profile).

A "user input" as used herein is intended to include a measured interaction with the user interface of a device (e.g., a screen) such as swiping, tapping, double tapping, pressing, elongated pressing, holding, rotating, pinching open/spreading, pinching closed, dragging, and multi-finger gestures. Furthermore, a "navigation mechanism" as used herein is intended to include a digital rendering of a joystick, slider, button(s), trackball, or another user input mechanism. For example, a "navigation mechanism" is an image file stored locally within the memory of a device, or stored externally within one or more databases and accessed by the navigation mechanism for display on a user device. A "content page" as used herein is intended to include individual pages within an application that provide different functionality for interacting with an application. For example, a "content page" may be a user profile, private messaging page, application settings page, online store, curated content feed, user's media feed based on followed users, image editing page, image comments section, camera interface, user photo gallery, or another page within an application.

FIG. 1 depicts an example embodiment of a network system 100 having a client-server-based network architecture for exchanging data over a network. For example, the network system 100 may be a media sharing system where clients communicate and exchange data within the network system 100. The data pertains to various functions (e.g., sending and receiving text and media, tagging media with a location, etc.) associated with the network system 100 and its users. Although illustrated herein as client-server architecture, other embodiments may include other network architectures, such as peer-to-peer or distributed network environments.

A networked system 102, in the example form of a network-based media sharing or navigation system, provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser), client applications 114, and a programmatic client 116 executing on the client device 110. The client device 110 includes the web client 112, the client application(s) 114, and the programmatic client 116 alone, together, or in any suitable combination. Although FIG. 1 shows one client device 110, in other implementations, the network system 100 comprises multiple client devices.

The client device 110 comprises a computing device that includes at least a display and communication capabilities that provide access to the networked system 102 via the network 104. The client device 110 may be, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game console, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

The client device(s) 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Each of the client device(s) 110 can comprise a computing device that includes at least a display and communication capabilities with the network 104 to access a media sharing system 140 and navigation system(s) 146.

In some example embodiments, the client device(s) 110 execute the client application(s) 114. The client application(s) 114 can provide functionality to present information to a user 106 and communicate via the network 104 to exchange information with the media sharing system 140 and the navigation system(s) 146. For example, the client device 110 includes one or more client applications 114 such as, but not limited to, web browsers, book reader apps (operable to read e-books), media apps (operable to present various media forms including audio and video), fitness apps, biometric monitoring apps, messaging apps, and electronic mail (email) apps.

If the media or other application 114 is included in the client device 110, then this application is configured to locally provide the user interface and at least some of the functionalities with the application configured to communicate with the networked system 102, on an as needed basis, for data or processing capabilities not locally available (e.g., access to media uploaded by other users, image or audio processing mechanisms hosted via an external server). Conversely, if the media sharing or other application is not included in the client device 110, the client device 110 can use its web browser to access the media sharing site (or a variant thereof) hosted on the networked system 102. The programmatic client 116 within client device 110 can, for example, be a media editing and sharing application (e.g., the VSCO® application developed by VISUAL SUPPLY CO.,® of Oakland, Calif.) to enable users to edit media content on the networked system 102, and to perform batch-mode communications between the programmatic client 116 and the networked system 102.

Users (e.g., the user 106) comprise a person, a machine, or other means of interacting with the client device 110. The user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

As shown in FIG. 1, the media sharing system 140 contains one or more interface module(s) (e.g., a web server) 142, which receive requests from various client computing devices and servers, such as client device(s) 110 executing client application(s) 114, and third party server(s) 130 executing third party application(s) 132. In response to received requests, the interface module(s) 142 communicates appropriate responses to requesting devices via a network 104. For example, the interface module(s) 140 can receive requests such as Hypertext Transfer Protocol (HTTP) requests, or other web-based, Application Programming Interface (API) requests.

The media sharing system 140 also includes various application logic module(s) 144, which, in conjunction with the interface module(s) 142, generate various user interfaces with data retrieved from various data sources or data services (e.g., from database(s) 126). Individual application logic module(s) 144 may be used to implement the functionality associated with various applications, services, and features of the media sharing system 140. For instance, a media sharing and media editing application can be implemented with one or more of the application logic module(s) 144. The media sharing application provides a navigation mechanism for users of the client device(s) 110 to navigate through various content pages within the media sharing system. In an example, a user edits a picture using various image filters and wants to share the picture on another social media site (e.g., FACEBOOK®). Using the navigation system 146, the user can navigate to another content page within the application that provides functionality for the user to share the edited image on another social media page (e.g., a "Share" page). Of course, other applications and services may be separately embodied in their own application logic module(s) 144.

The media sharing system 140 can host one or more interface module(s) 142, application logic module(s) 144, and navigation system(s) 146, each of which comprises one or more modules or applications and each of which can be embodied as hardware, software, firmware, or any combination thereof. The media sharing system 140 is, in turn, shown to be coupled to one or more database server(s) 124 that facilitate access to one or more information storage repositories or database(s) 126. In an example embodiment, the database(s) 126 are storage devices that store information necessary for navigation and for the display of a navigation icon to the navigation system(s) 146. The database(s) 126 also store media content information and social information, in accordance with some example embodiments.

Additionally, a third party application 132, executing on third party server(s) 130, is shown as having programmatic access to the networked system 102 via the programmatic interface provided by the interface module(s) 142. For example, the third party application 132, utilizing information retrieved from the networked system 102, supports one or more features or functions on a website hosted by the third party. The third party website, for example, provides one or more media viewing, media editing, or messaging functions that are supported by the relevant applications of the networked system 102.

The navigation system(s) 146 provides navigation functionality between various content pages with the application server(s) 140 to the users that access the networked system 102. While the navigation system 146 is shown in FIG. 1 to form part of the networked system 102, it will be appreciated that, in alternative embodiments, navigation system 146 may form part of a media sharing system that is separate and distinct from the networked system 102. In some example embodiments, the interface module(s) 142 may form part of the navigation system(s) 146.

The navigation system(s) 146 comprises a contextual appearance mechanism 148 and a menuless navigation mechanism 150. The contextual appearance mechanism 148 provides functionality to change the appearance of a navigation mechanism within navigation system 146 based on the content page that a user is viewing. For example, a navigation icon is displayed as a blue oval when the user is viewing a content page where the user edits an image using image filters, and when the user returns to the home page the contextual appearance mechanism 148 changes the navigation icon to an orange oval. The menuless navigation mechanism 150 provides functionality to navigate from one content page to another when a user input is within an input region on client device 110, while reserving functionality for other user actions when the user input is outside the input region.

Further, while the client-server-based network system 100 shown in FIG. 1 employs a client-server architecture, the present inventive subject matter is, of course, not limited to such an architecture, and can equally well find application in a distributed, or peer-to-peer, architecture system, for example. The various systems of the media sharing system 140 (e.g., the navigation system(s) 146 and the interface module(s) 142) can also be implemented as standalone software programs, which do not necessarily have networking capabilities.

Figure 2:
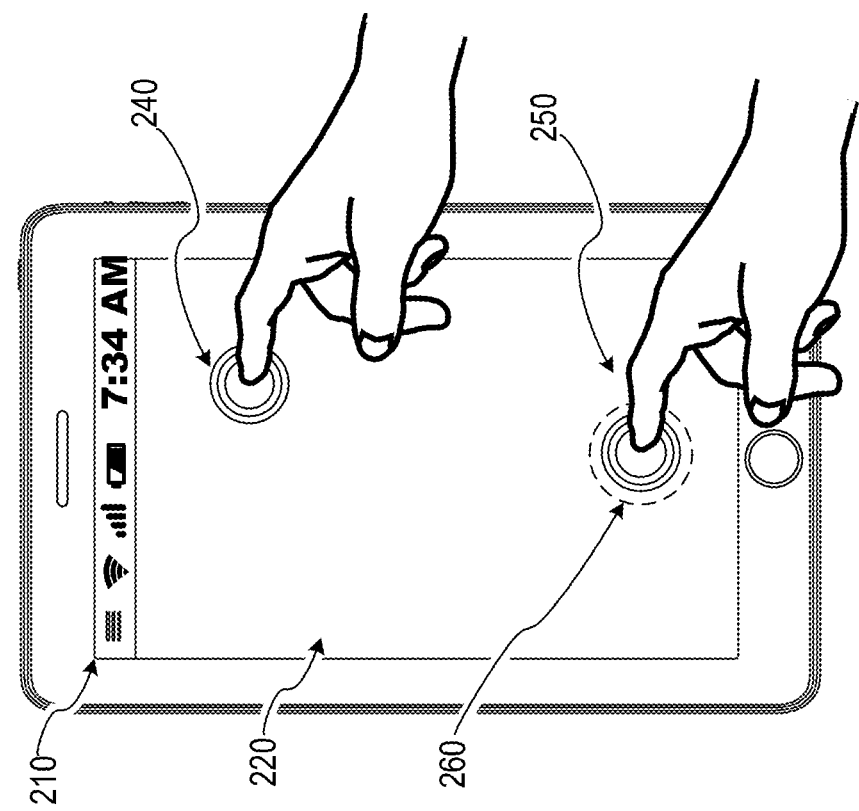
FIG. 2 is an illustrative user interface diagram, depicting a layout of a system on a user device, according to some example embodiments.
Figure 2:
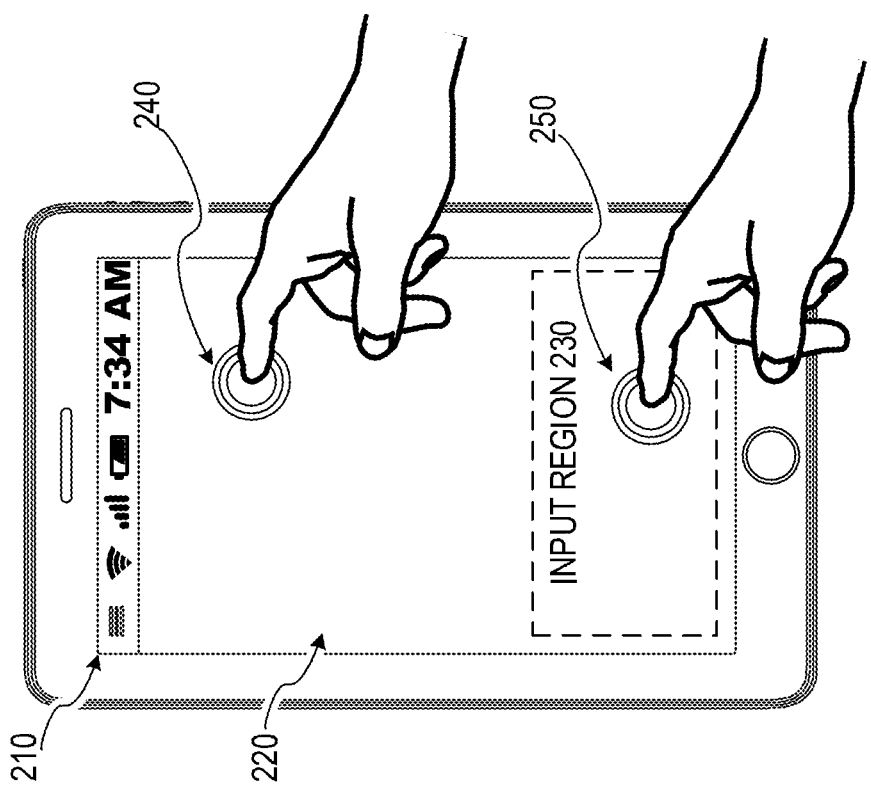

Referring now to FIG. 2, a diagram 200 illustrating an example of the navigation system 146 is shown. A user device 210 has an input device 220 (e.g., a capacitive touch screen, a display, or another user input sensor), which is operative to detect user input gestures. Within the input device 220, there is an input region 230. When a first user input 250 is within the input region 230, the system translates the first user input 250 into a navigation action, which causes the system to change the display on the user device 210 from one content page to another content page. However, if a second user input 240 is detected outside of the input region 230, the second user input 240 is not translated into a navigation action so the system does not switch the device display from one content page to another content page. For example, if a user swipes to the left within the input region 230, this causes the system to navigate from one content page to another. If the user swipes to the left outside of input region 230, this causes the system to take another action (for example, horizontal scrolling within the content page or decreasing the strength of an image processing filter).

FIG. 2A is the diagram 200 depicting another example of the navigation system 146. In this example, the input region 260 is minimized in space so that most of the input device 220 is reserved for the second user inputs 240, which interact with the system 150 in ways other than navigating from one content page to another content page. By displaying an input region inside which a user input 250 causes the navigation mechanism 146 to navigate from one content page to another content page, the navigation mechanism 146 minimizes screen clutter and allows for a wide range of user inputs to be used to interact with the system. This is especially useful for user devices with small screens, such as smartwatches or smartphones. Rather than reserving screen space for numerous buttons or large menus with text large enough for all users to read easily, the same screen space can be used to display application functionality. Moreover, the navigation mechanism 146 containing two distinct regions in which user inputs 240 and 250 are interpreted differently allows for double the amount of functionality given a set of user inputs. Since the same user input (e.g., press and hold) can be associated with a different action depending on whether the user input originated within or outside of the input region, two separate actions for a user to access application functionality can be achieved for each user input detectable by the input interface (e.g., a screen).

In various embodiments, user inputs 240 and 250 are associated with various actions taken by the navigation system 146. When the context translator senses a first user input within input region 260, the context translator accesses the context database to identify the first interface action (e.g., a navigation action) as being associated with the first user input. When the context translator senses a second user input outside of input region 260, the context translator accesses the context database to identify the second interface action (e.g., an action other than a navigation action, such as a zooming action) as being associated with the second user input.

Figure 3:
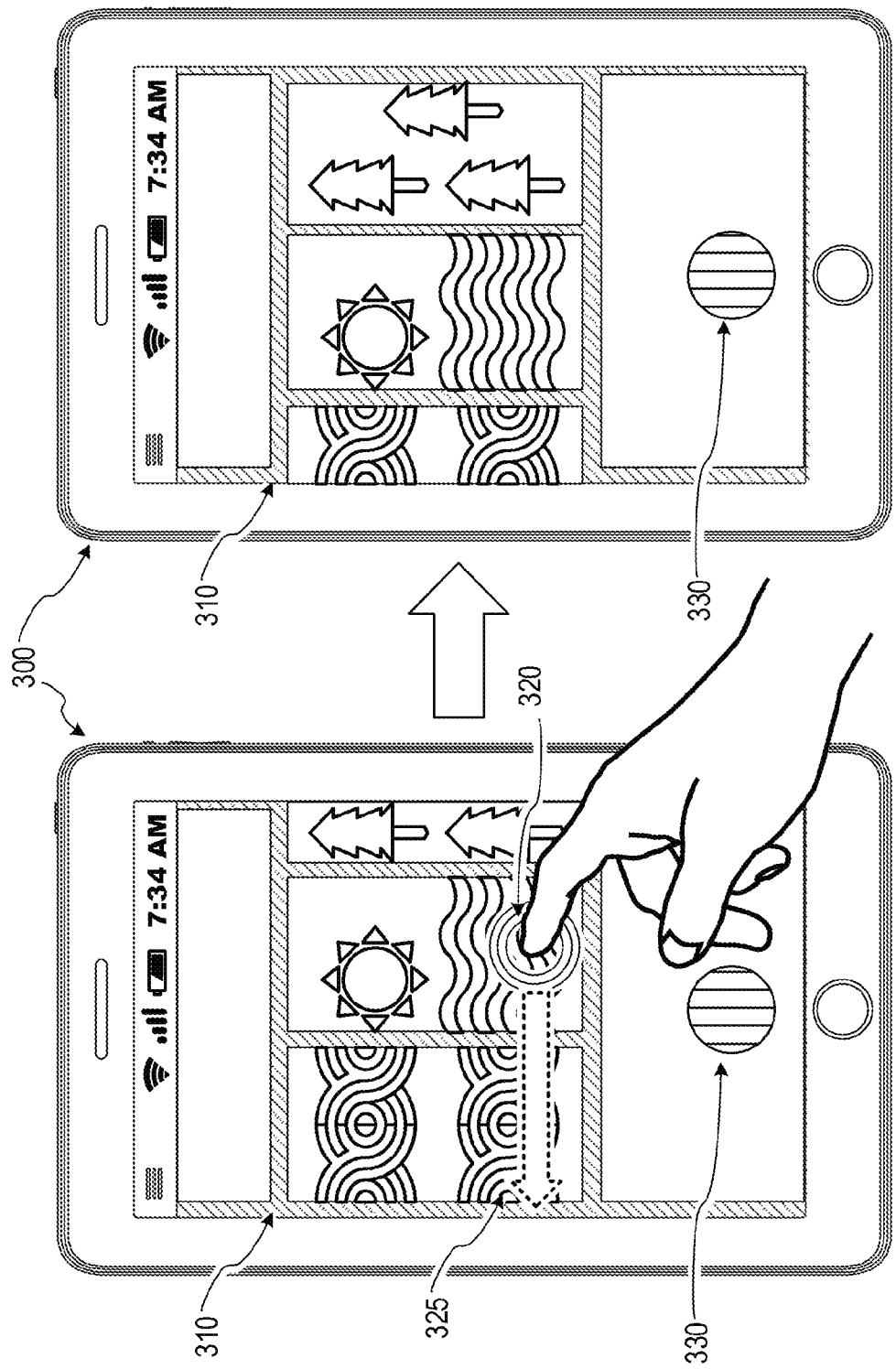
FIGS. 3, 3A, 3B, and 3C are illustrative diagrams depicting examples of system responses to user inputs, according to some example embodiments.

FIGS. 3, 3A, 3B, and 3C are illustrative diagrams depicting examples of user inputs detected inside the input region versus outside the input region, and the resulting actions taken by the system in response to each user input. Turning now to FIG. 3, an example user input 325 outside the input region of device 300 is shown. In the depiction on the left, where device 300 is displaying content page 310, the user places their finger on the screen of device 300 at location 320, which is outside the input region. For example, the input region is the area where the navigation icon 330 is depicted. Therefore, example user input 325 (depicted as a user swiping left) is not interpreted as interacting with the navigation mechanism, which is depicted as the navigation icon 330. The depiction on the right shows an example embodiment of the effect of user input 325. Content page 310 and navigation icon 330 are unchanged, but user input 325 caused the content within content page 310 to scroll to the left.

Figure 3A:
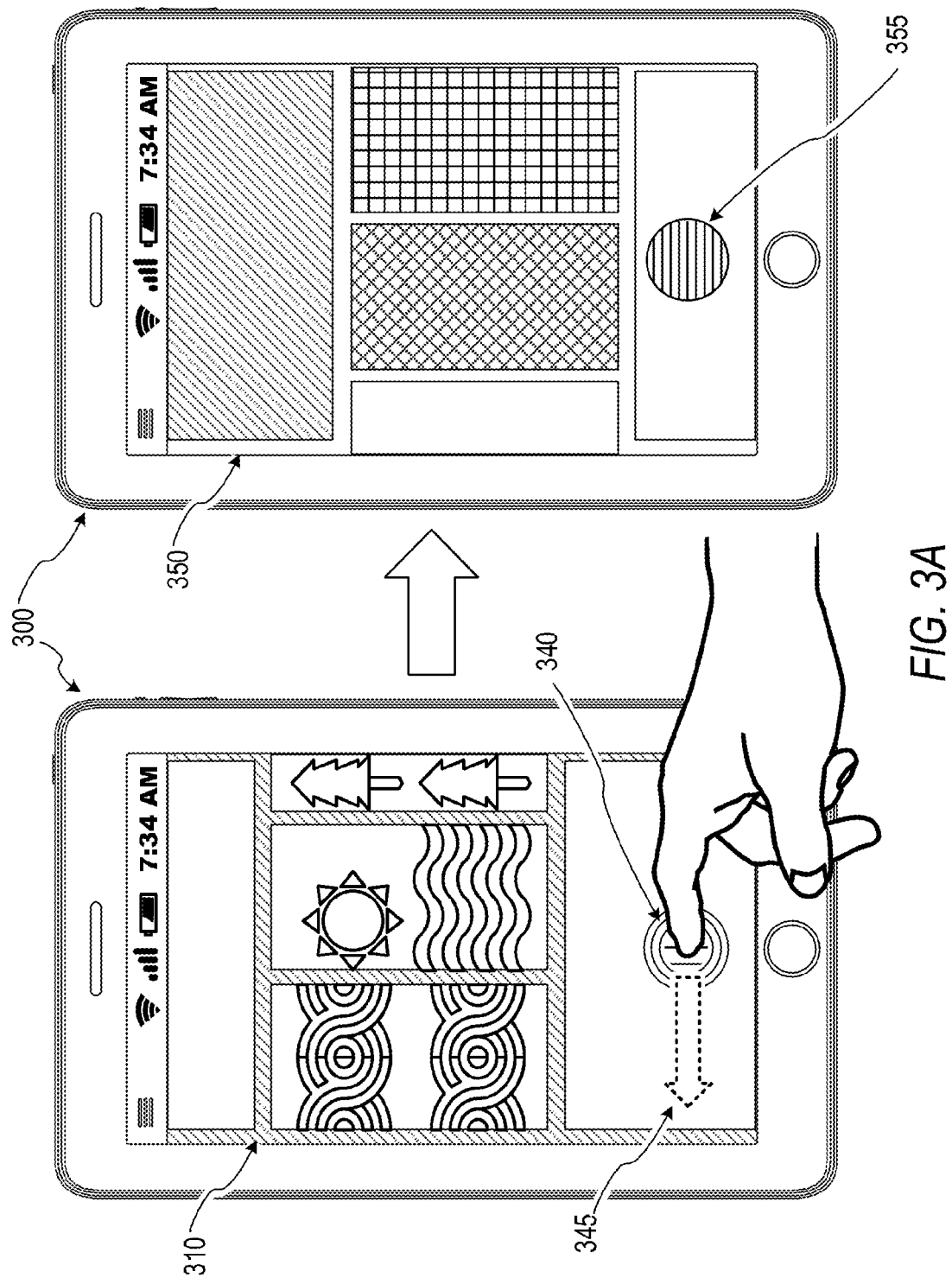

In FIG. 3A, an example is shown where a user input 345 begins at a location 340, which is within the input region. For example, the input region is the area in which the navigation icon is displayed. In the depiction on the left, device 300 is displaying content page 310. The user input 345 is depicted as a swipe to the left, like in FIG. 3. However, unlike in FIG. 3 where the user input 325 begins outside of the input region at location 320, FIG. 3A depicts user input 345 beginning within the input region at location 340. Thus, the navigation system 146 translates the user input into a navigation action. As seen in the depiction on the right, the system navigates to a different content page 350. In the example embodiment depicted, the navigation icon 355 has changed in appearance to denote the change from content page 310 to different content page 350.

Figure 3B:
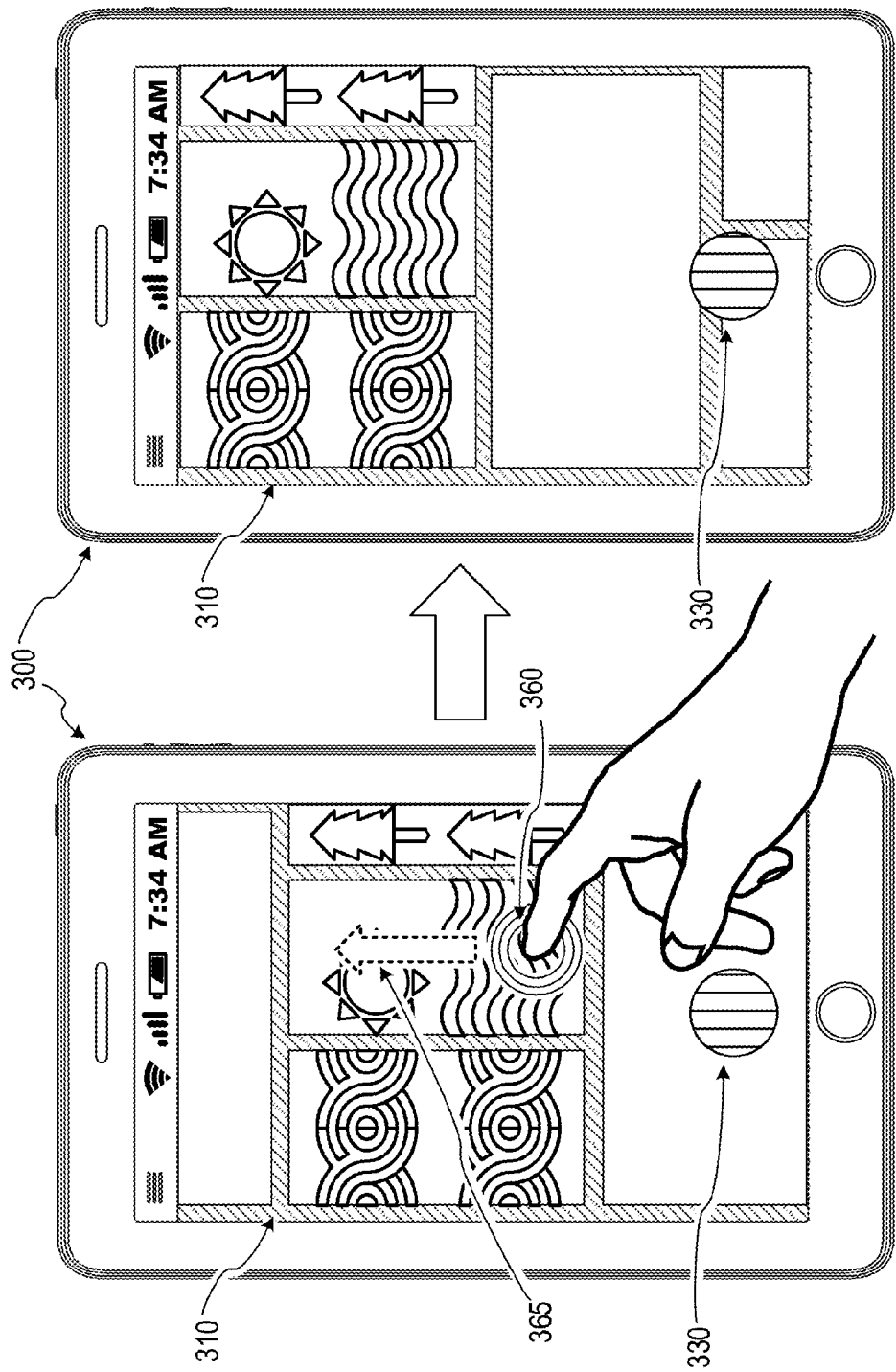

In FIG. 3B, an example user input 365 outside the input region of device 300 is shown. In the depiction on the left, where device 300 is displaying content page 310, the user interacts with the screen of device 300 at location 360, which is outside the input region. Therefore, example user input 365 (depicted as a user swiping upwards) is not interpreted to engage the navigation mechanism, which is depicted as the navigation icon 330. The depiction on the right shows an example embodiment of the effect of user input 365. Content page 310 and navigation icon 330 are unchanged, but user input 365 caused the content within content page 310 to scroll upwards, as is shown on the right side.

Figure 3C:
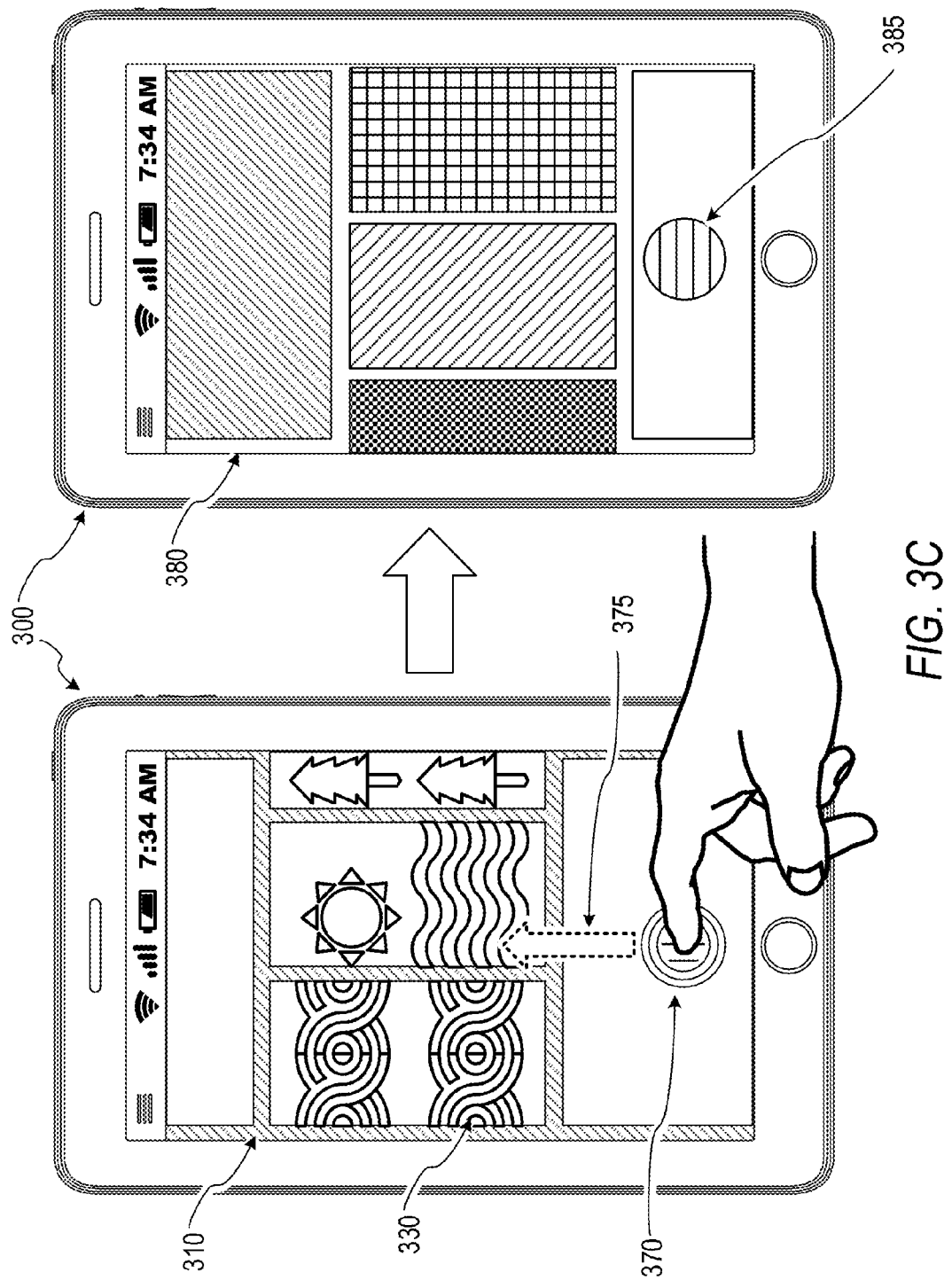

In FIG. 3C, an example is shown where a user input 375 begins at a location 370, which is within the input region. In the depiction on the left, device 300 is displaying content page 310. The user input 375 is depicted as a swipe upwards, similar to FIG. 3B. Unlike in FIG. 3B where the user input 365 begins outside of the input region at location 360, FIG. 3C depicts user input 375 beginning within the input region at location 370. Thus, the navigation system 146 translates the user input into a navigation action. As seen in the depiction on the right, the system navigates to a different content page 380. In the example embodiment depicted, the navigation icon 385 has changed in appearance to denote the change from content page 310 to different content page 380.

Figure 4:
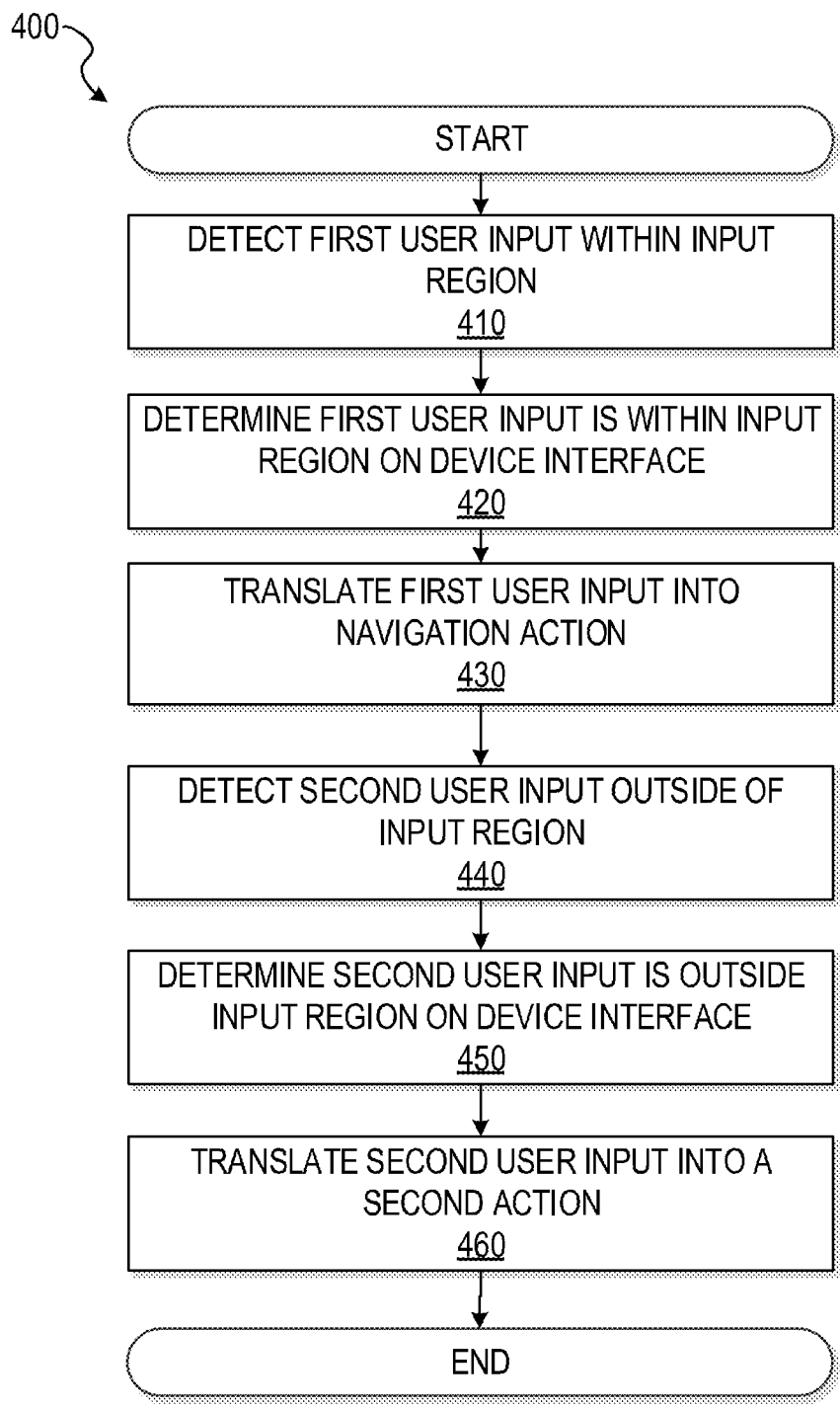
FIG. 4 is a flow diagram illustrating an example method for providing navigation functionality using a system.

FIG. 4 is a flow diagram depicting a method 400 for providing navigation functionality using navigation system(s) 146. At operation 410, navigation system 146 detects a first user input within an input region. For example, when the device is a mobile phone, the navigation system 146 is operable to detect a first user input within an input region using a capacitive touch screen. At operation 420, the navigation system 146 determines that the user input is within the input region on the device interface. At operation 430, the navigation system 146 translates the first user input into a navigation action. In various example embodiments, navigation actions include navigating to a user's profile, a home page, a content feed, a search page, an image modification page, or a curated media feed.

At operation 440, the navigation system 146 detects a second user input outside of the input region. In an example embodiment where the device is a tablet, the navigation system 146 is operable to detect a second user input outside of an input region using a capacitive touch screen. At operation 450, the navigation system 146 determines that the second user input is outside the input region on the device interface. At operation 460, the navigation system 146 translates the second user input into a second action. The second action is a different action than the navigation action from operation 430. For example, the second action may be a scroll action within the same content page, an image manipulation command, volume control, zoom manipulation, or another action.

Thus, the same type of user input causes the system 150 to respond differently based on whether the user input is inside the input region or outside of the input region. In an example embodiment where the device is a smartwatch, the user double-tapping within the input region causes system 150 to navigate to the home page, while the user double-tapping outside of the region causes the system 150 to zoom in on the location where the user double-tapped.

Figure 5:
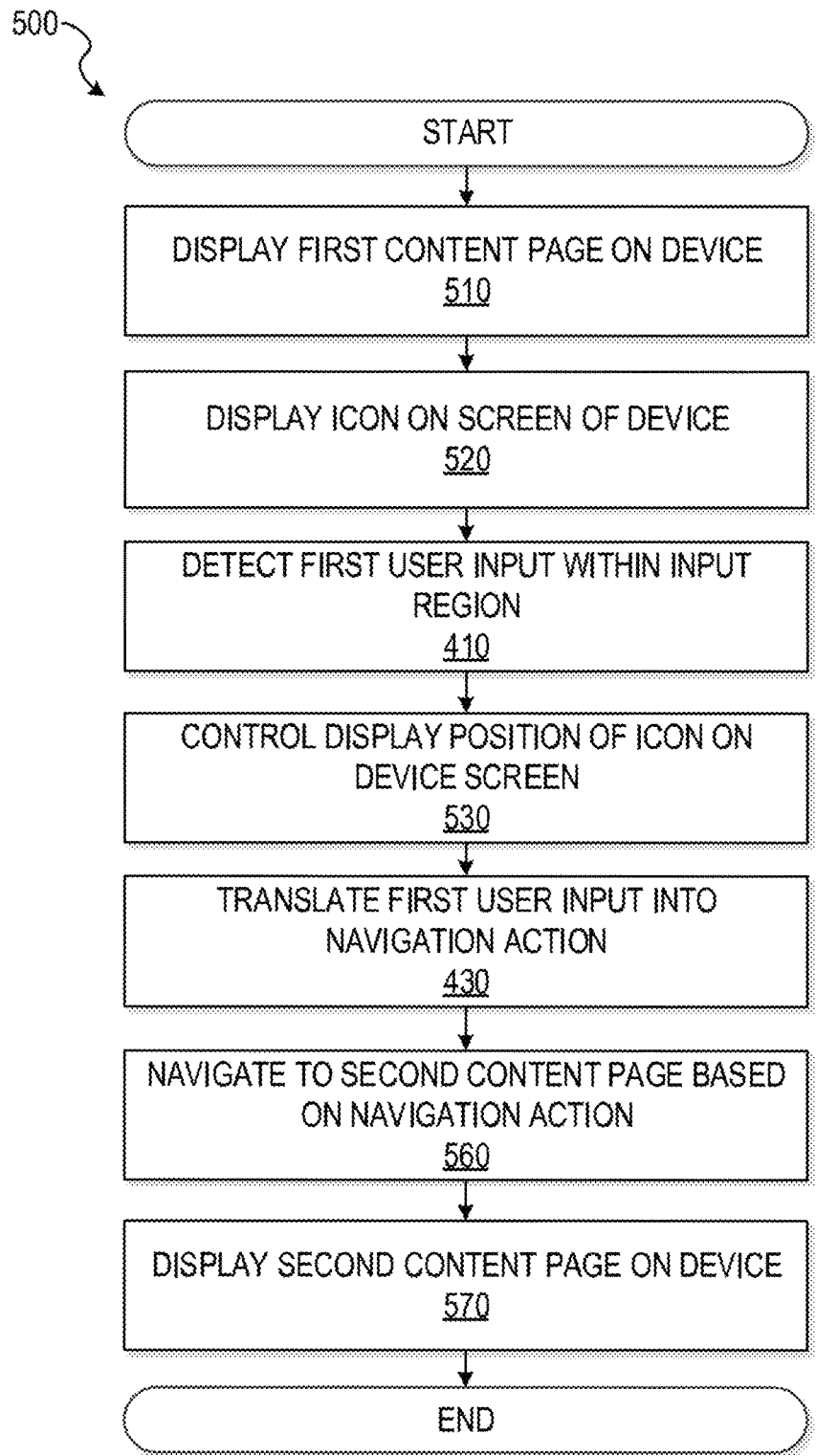
FIG. 5 is a flow diagram illustrating further example operations for navigating using a system.

Referring now to FIG. 5, a flow diagram illustrating further example operations for navigating using navigation system 146 is shown. Prior to detecting a first user input within the input region at operation 410, the system 146 displays a first content page on the device at operation 510. For example, the system 146 displays a homepage on the user's device. At operation 520, the system 146 displays an icon on the screen of the device. In various embodiments, this icon is a circular or near-circular graphic functioning as a virtual joystick that changes position on the screen in response to a user input. At operation 530, the navigation system 146 controls the display position of the icon on the device screen. As seen in FIG. 4 at operation 430, the navigation system translates the first user input into a navigation action. Then, at operation 560, the system navigates to a second content page based on the navigation action. In some embodiments, a page navigator changes the display from a first content page to a second content page based on a first interface action (e.g., the navigation action). For example, the navigation system 146 navigates from a user's profile to a curated media feed, where the user profile displayed in operation 510 is changed to the curated media feed in operation 560. At operation 570, the system displays the second content page on the device. Thus, in example embodiments, the navigation system 146, and more specifically the menuless navigation mechanism 150, allows for navigation through a set of menu items using the navigation icon on a screen of the device.

Figure 6:
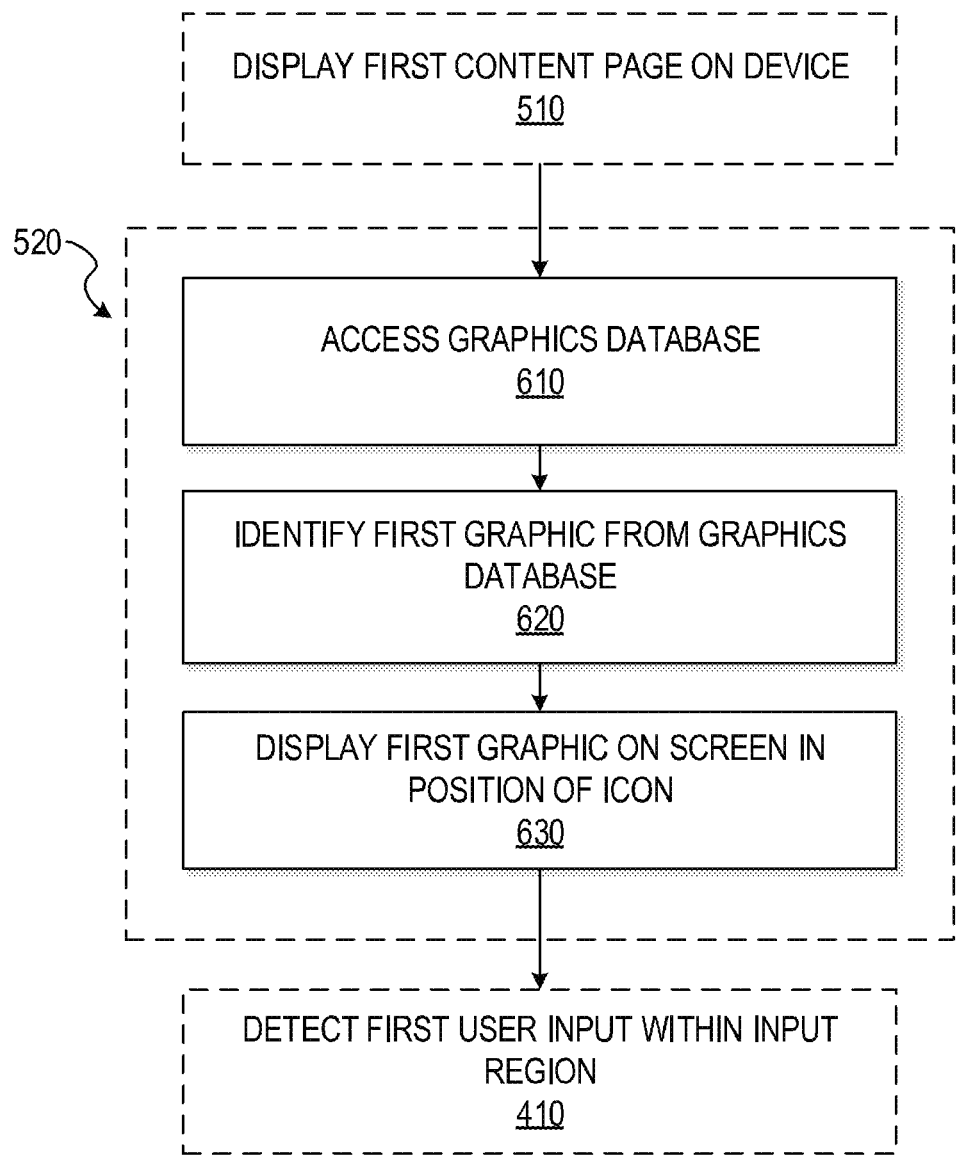
FIG. 6 is a flow diagram illustrating examples of an icon display on a device.

FIG. 6 is a flow diagram illustrating further examples explaining how the navigation system 146 displays an icon on a device at operation 520. At operation 610, the navigation system 146 accesses a graphics database. In various embodiments, the graphics database is hosted locally on a user's device. In other embodiments, the graphics database is hosted externally on a third party server 130 or on the application database 126, then accessed for use on the client device 110 through use of network 104, e.g., the Internet. At operation 620, the navigation system 146 identifies a first graphic from the graphics database. In example embodiments, individual content pages within the application are associated with graphics from the graphics database. For example, each graphic has an associated content page index, which matches an index of the associated content page and allows the navigation system 146 to identify a graphic from the graphics database to display with a content page. At operation 630, the navigation system 146 displays the first graphic on the screen of client device 110 in the position of the icon. For example, in operation 630, the navigation system 146 causes the display of the graphic to be in the bottom half of the screen, horizontally centered, as a base position.

Figure 7:
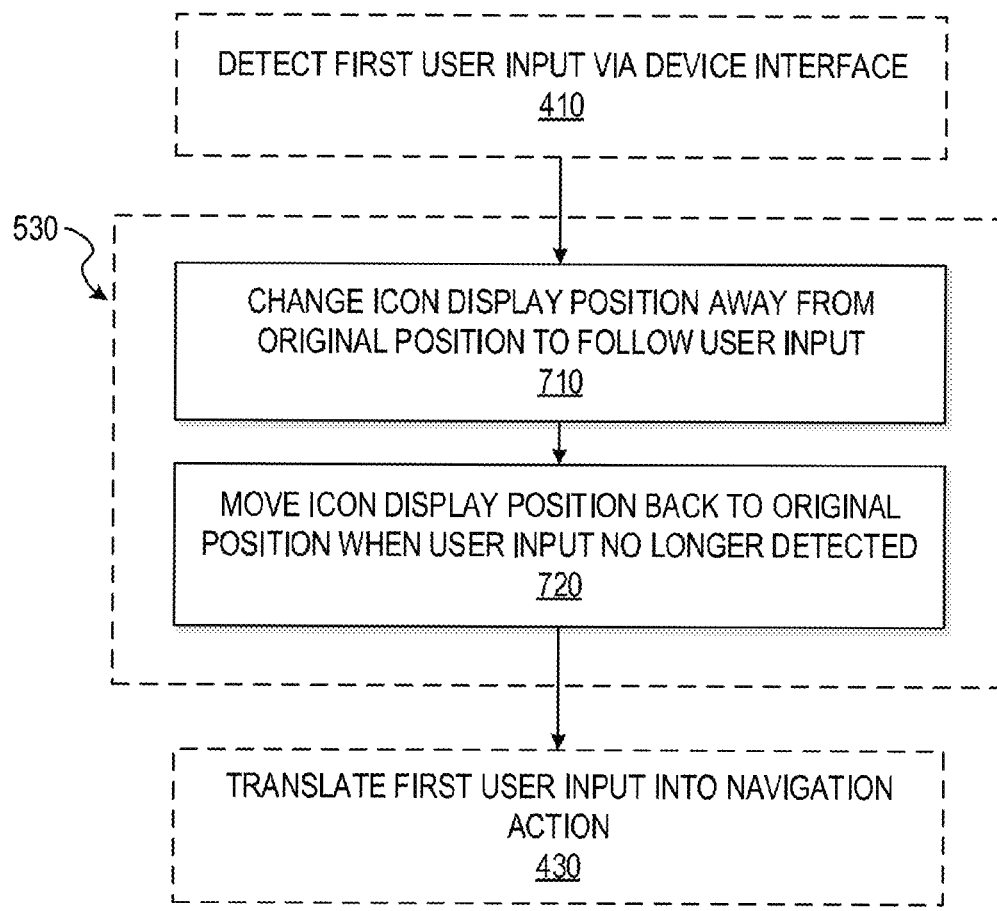
FIG. 7 is a flow diagram illustrating examples of display position control of an icon.

FIG. 7 is a flow diagram illustrating further examples to explain how the navigation system 146 controls the display position of an icon at operation 530. At operation 710, after detecting a first user input via an interface of client device 110 in operation 410, the navigation system 146 changes the display position of the icon away from an original position to follow the user input. As an example, if the user input is a swiping motion where the user swipes to the left using the icon, the display position of the icon moves left to follow the user input. At operation 720, when the user input is no longer detected (e.g., if the user removes her finger from a screen of client device 110), the navigation system 146 moves the display position of the icon back to the original position. In various embodiments, this is done as an animation of the icon moving from the changed position back to the original position. However, in other embodiments, the icon may simply disappear from the changed position while reappearing in the original position without use of an animation of the icon traveling back to its original position. Once the user input is no longer detected, for example, the navigation system translates the first user input detected in operation 410 into a navigation action in operation 430.

Figure 8:
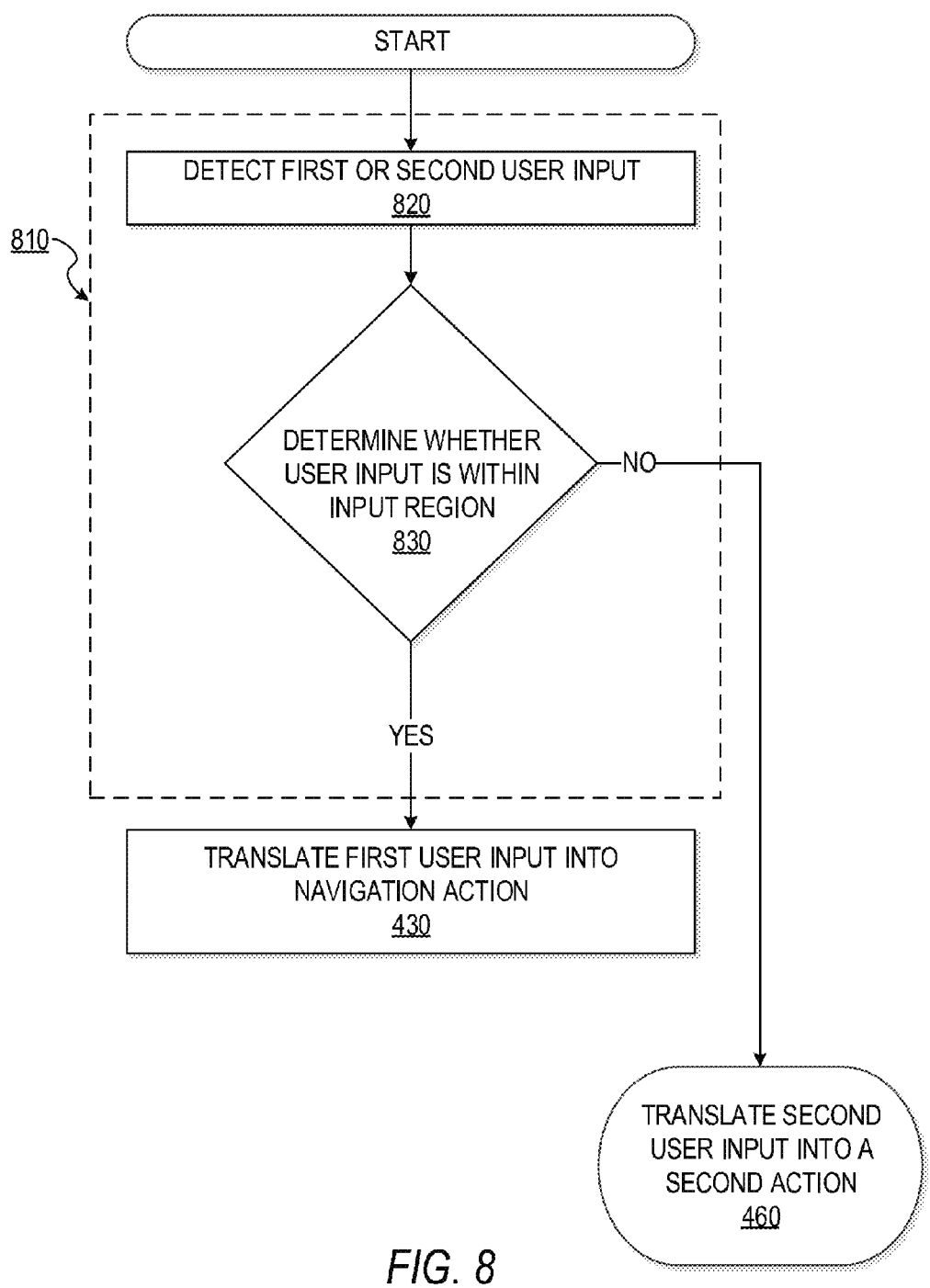
FIG. 8 is a flow diagram illustrating example decision logic when a system registers a user input.

Referring now to FIG. 8, a flow diagram illustrating example decision logic is shown. Operation 810 contains logic to determine whether a user input will be used to navigate from one content page to another content page, or whether the user input will be translated into a different action. At operation 820, a first or second user input is detected on an interface of client device 110. For example, the device 110 is a smartphone, and the user input is detected via use of a capacitive touch screen. At operation 830, the navigation system 146 determines whether or not the user input is within the input region. Referring back to FIGS. 2-3, the input region is defined as an area within a region of the screen in some embodiments, or a region limited to the area of the icon 260. If the system determines that the user input is within the input region, then the user input is translated into a navigation action as described in operation 430 of FIG. 4. If the system determines that the user input is outside of the input region, the user input is translated into a second action, which is different from the navigation action, as seen in operation 460 of FIG. 4. As an illustrative example, in an embodiment where the device is a tablet, the user swiping upwards within the input region causes navigation system 146 to navigate to the home page, while the user swiping upwards outside of the input region causes the system 146 to scroll upwards within the content page.

Figure 9:
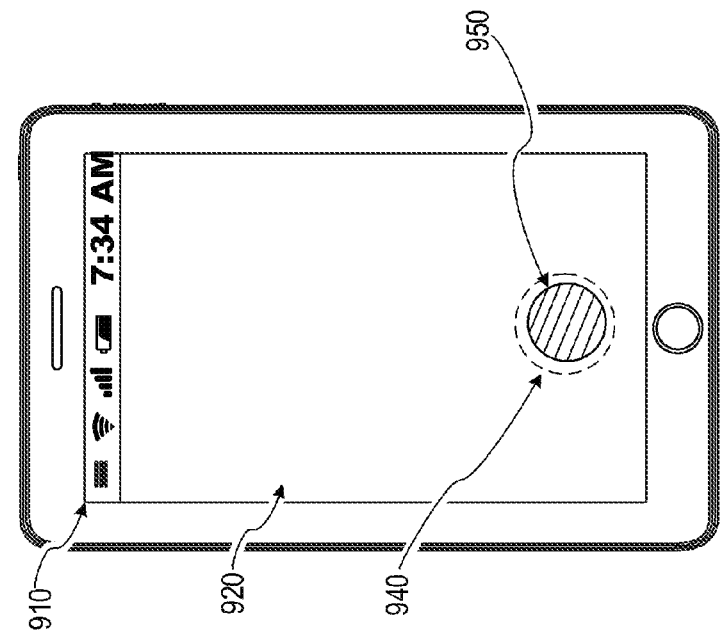
FIG. 9 is an illustrative user interface diagram depicting an example layout of a system appearance on a client device.
Figure 9:
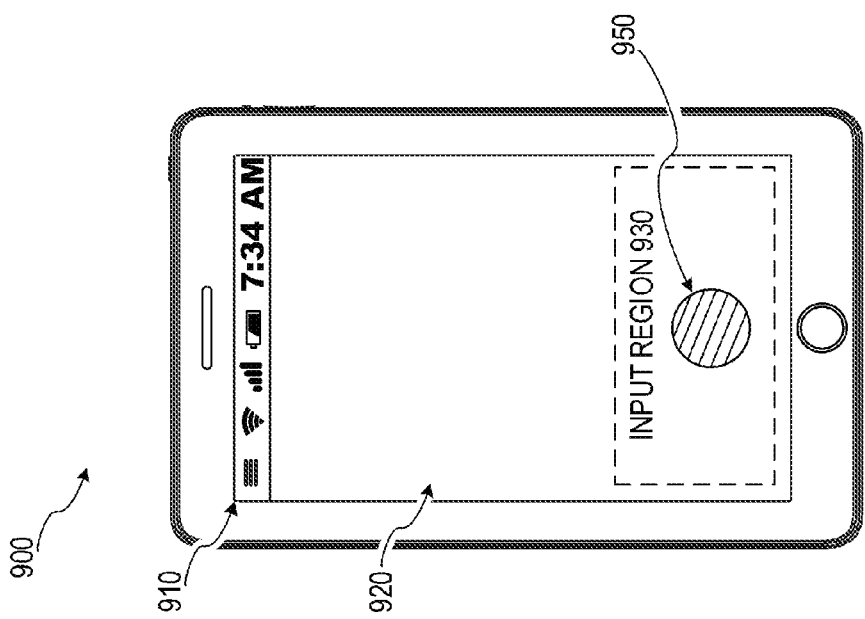

FIG. 9 is an illustrative diagram depicting an example 900 of navigation system 146 as it would appear on a client device 110. In FIG. 9, device 910 is shown with a user interface 920. For example, device 910 can be a smartphone, smartwatch, tablet, virtual reality headset, or another user device. On the user interface of device 910, a navigation graphic 950 appears within an input region 930. Depending on the embodiment, the input region 930 may be a rectangular area located outside of the borders of the navigation graphic 950. In other embodiments, the input region 930 is a changing zone which follows the border of navigation graphic 950, potentially with a small tolerance to account for inaccuracy in a user's input gesture. That is, the input region 930 and navigation graphic 950 may share the same border, with any input outside the border of navigation graphic 950 falling outside of the input region 930. The navigation graphic is depicted as a two-dimensional or three-dimensional image or animation, depending on the embodiment. In various embodiments, the system senses a screen resolution of the user device, and alters the size of the navigation icon as well as the size of the input region based on the screen resolution of the device. In example embodiments, compared to a larger user device such as a tablet, the system would render a smaller navigation icon and a smaller input region for a smaller user device such as a smartwatch.

Figure 10:
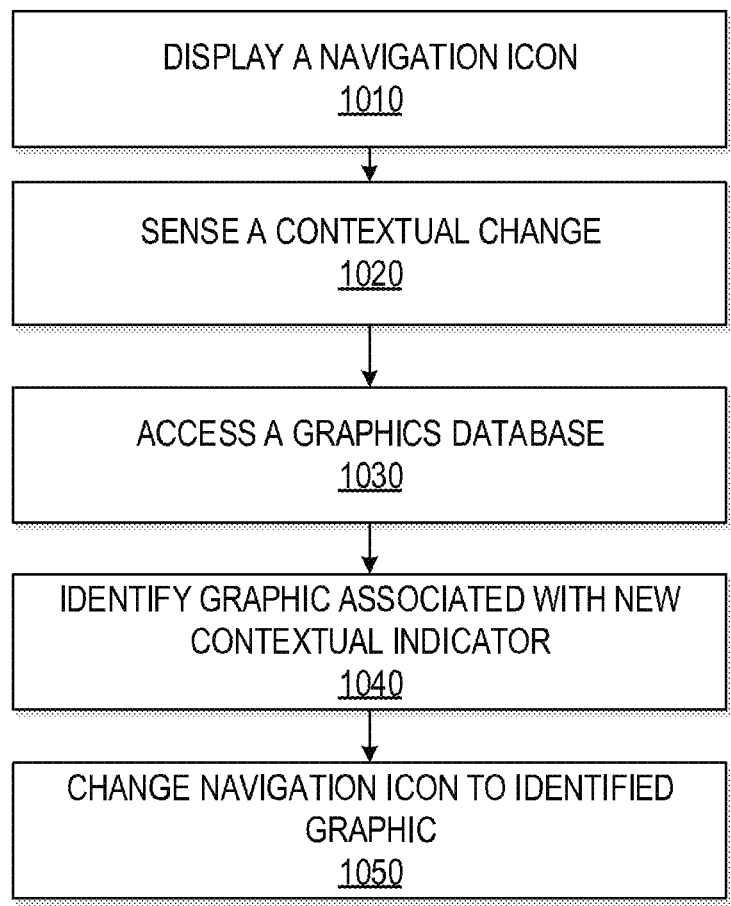
FIG. 10 is a flow diagram illustrating an example method for providing navigation functionality using a system, where a navigation icon changes appearance based on the content page a user is currently viewing.

FIG. 10 is a flow diagram depicting a method 1000 for providing navigation functionality using navigation system(s) 146, where a navigation icon (i.e., a navigation node) changes appearance based on the content page that a user is currently viewing. Thus, a user can tell which content page the user is viewing by looking at the appearance of the navigation icon. Content pages can include, in various embodiments, user profiles, hand-curated media feeds, image editing screens, photo albums, virtual or physical items for sale (e.g., photographic filters), messaging inboxes, and more. At operation 1010, the navigation system 146 displays a navigation icon. For example, the navigation icon is associated with a first user interface context. At operation 1020, the navigation system 146 senses a contextual change. For example, a user input starting within the input region 930 would trigger a contextual change, sensed by the navigation system 146 in operation 1020. In various embodiments, the contextual change is a change from a first user interface context to a second user interface context. In an example, the first user interface context is associated with the homepage of an application, and the second user interface context is associated with the settings page of the application.

In operation 1030, the navigation system 146 accesses a graphics database. In some embodiments, the graphics database is downloaded and stored locally on a client device 110. Alternatively, in other embodiments, the graphics are not stored locally but hosted on an external server and accessed through a network 104, e.g., the Internet. Once the navigation system 146 accesses the graphics database in operation 1030, the system identifies the graphic that is associated with the new contextual indicator in 1040. For example, if a contextual change is triggered by a user input interacting with the navigation icon, the new contextual indicator is associated with the page to which the system will navigate. Upon identifying the graphic associated with the new contextual indicator in 1040, the system 146 changes the navigation icon to the identified graphic (e.g., a second icon) in 1050. In various embodiments, a context changer accesses the context database and changes the navigation node to the associated icon and performs the associated navigation action in response to the user gesture. For example, the context changer accesses a context page database containing context page data including page indexes, and the context changer switches from a first content page with a first page index to a second content page with a second page index. In such an embodiment, the context changer causes the display mechanism to display the second content page. Thus, when a contextual change occurs, the navigation system 146 reflects this change by altering the graphic, which is displayed as the navigation icon.

Figure 11:
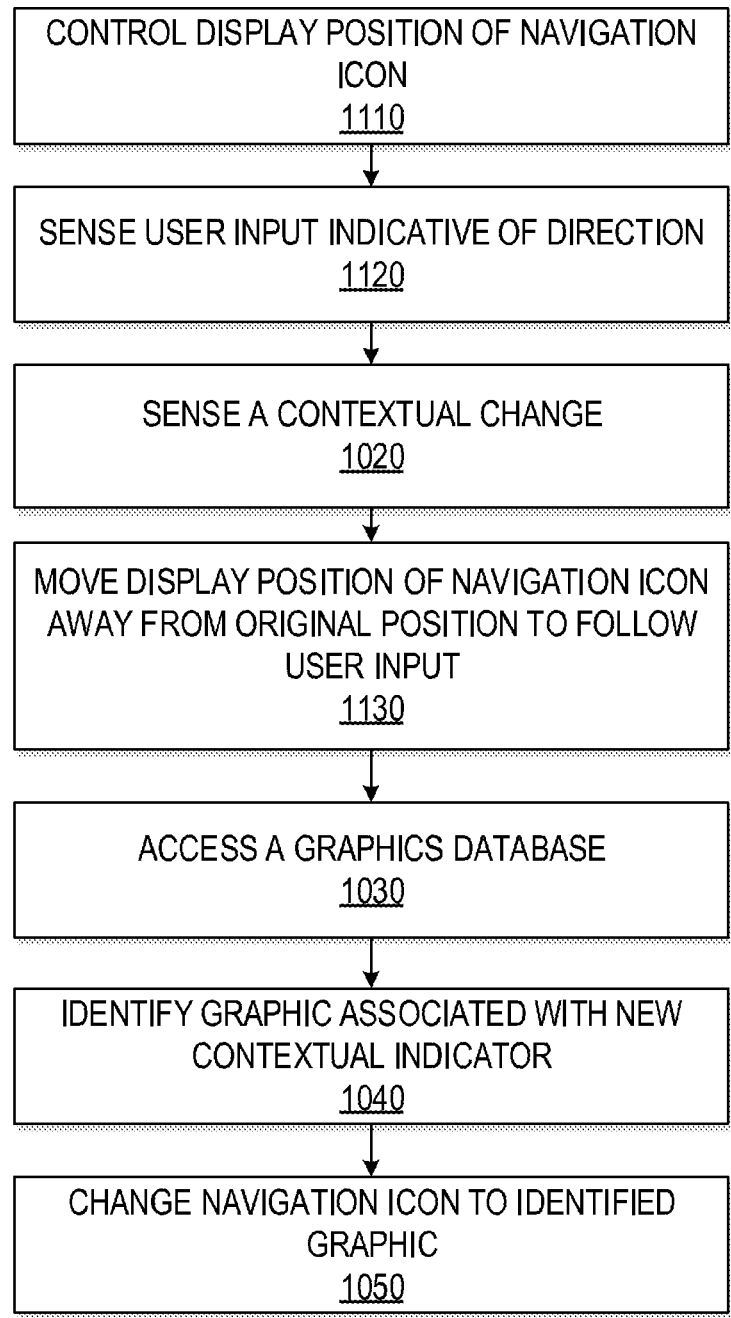
FIG. 11 is a flow diagram which illustrates, in more detail, a method for providing navigation functionality using a system, where a navigation icon changes appearance based on a content page a user is currently viewing.

FIG. 11 is an example flow diagram which describes, in more detail, a method 1100 for providing navigation functionality using navigation system(s) 146, where a navigation icon changes appearance based on the content page which a user is currently viewing. At operation 1110, the navigation system 146 controls a display position of a navigation icon. In various embodiments, the navigation icon has an original position (e.g., on the bottom of the screen and horizontally centered) where the navigation icon is displayed when there is no user input interacting with the navigation icon. At operation 1120, the navigation system 146 senses a user input indicative of a direction. In various embodiments, the user input may be a swiping gesture, a tapping or double-tapping gesture, a pinching or spreading gesture, a multi-finger gesture, or another user gesture. As described in FIG. 10, the navigation system senses a contextual change in operation 1020. In operation 1130, the navigation system 146 moves the display position of the navigation icon away from the original position in order to follow the user input. In an example where the user input is a swipe to the left, the position of the navigation icon as displayed on the device would move left along with the user's swipe. As described in FIG. 10, the navigation system 146 also accesses a graphics database in operation 1030, identifies a graphic associated with the new contextual indicator in operation 1040, and changes the navigation icon to the identified graphic in operation 1050.

Figure 12:
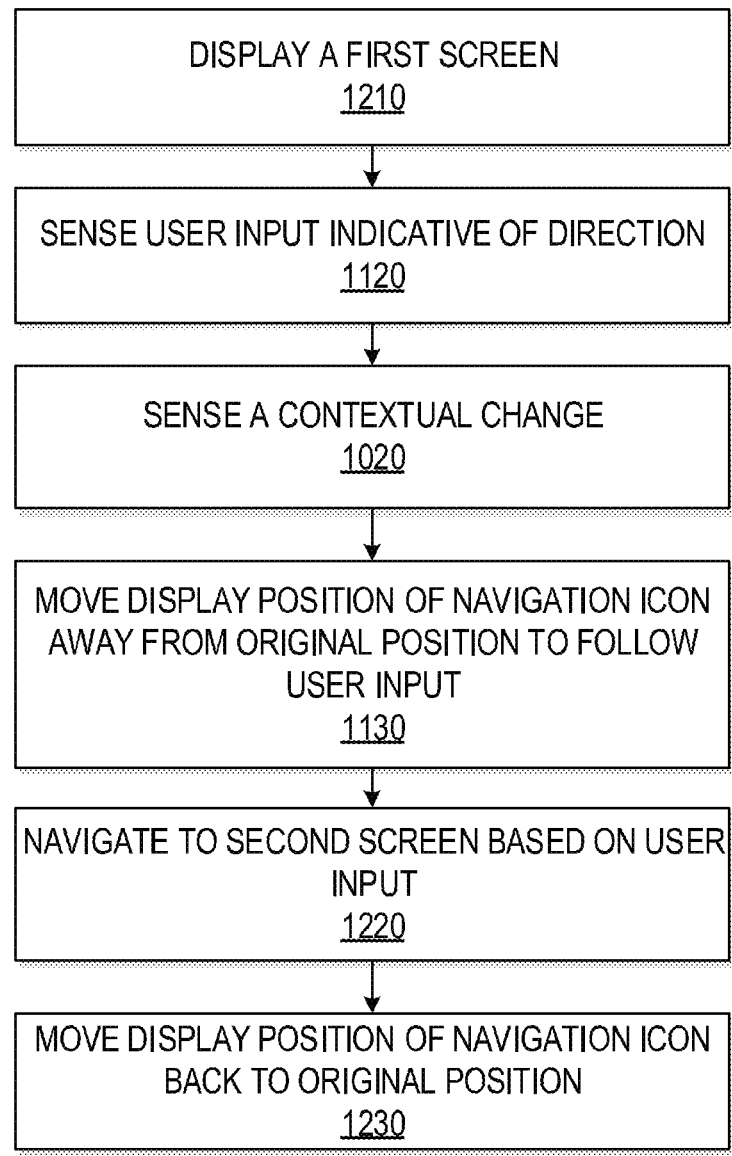
FIG. 12 is an example flow diagram which illustrates the system changing from one screen (e.g., a first content page) to a second screen (e.g., a second content page).

Referring now to FIG. 12, an example flow diagram 1200 that depicts the navigation system changing from one screen (e.g., a first content page) to another screen (e.g., a second content page) is illustrated. The navigation system 146 displays a first screen in operation 1210. For example, the navigation system displays a user's messaging inbox on the screen of a device. In operation 1120, as described in FIG. 11, the navigation system senses a user input indicative of a direction, and the system senses a contextual change in operation 1020. At operation 1130, as described in FIG. 11, the navigation system 146 moves the display position of the navigation icon away from an original position to follow a user input. In operation 1220, the navigation system 146 navigates to a second screen based on the user input. For example, the user input is a pinching gesture over the navigation icon, and based on this gesture, the system navigates to a camera interface where the user can take a picture using a device's camera. At operation 1230, the navigation system 146 moves the display position of the navigation icon back to the original position of the icon. For example, the user is viewing their media feed and swipes to the right. The icon follows the user's gesture to the right, and the system navigates to the user's personal photo albums. Once the contextual change has occurred, the navigation icon goes back to the original position on the screen rather than staying on the right side of the device screen.

Figure 13:
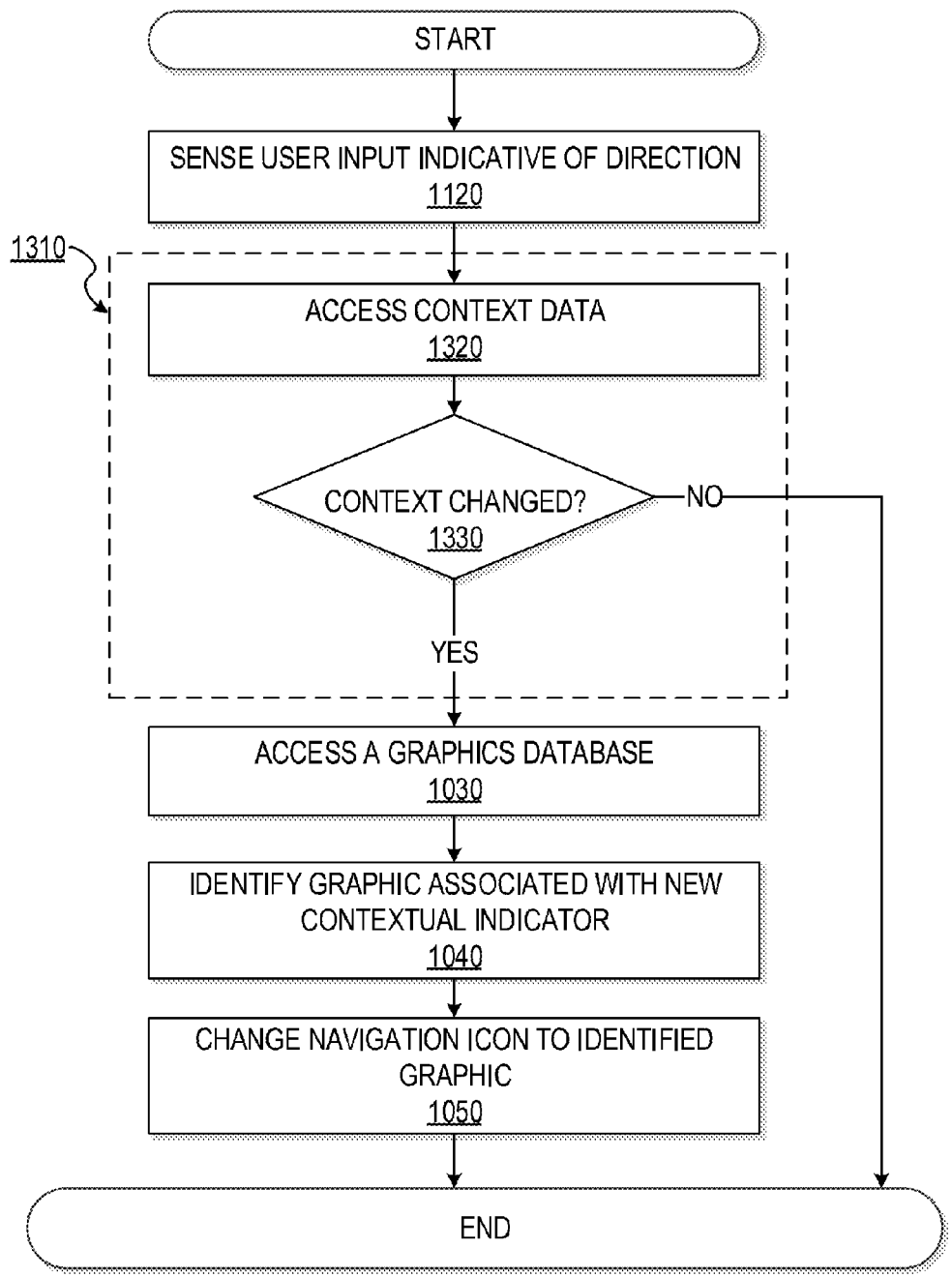
FIG. 13 is a flow diagram illustrating example decision logic, where a system determines whether or not to change appearance of a navigation icon.

Referring now to FIG. 13, a flow diagram illustrating example decision logic is shown. Operation 1310 deploys logic to determine whether the context has changed or not, to determine whether or not to change the navigation icon. At operation 1120, as described in FIG. 11, the navigation system 146 detects a user input indicative of a direction. In various embodiments, the detected user input is associated with a contextual change if the user input originates within the input region—for example, if the user performs a user gesture that starts with the user putting a finger or stylus within the borders of the navigation icon. At operation 1320, the system accesses context data, which is stored within a context database and accessed by a context translator which, responsive to sensing the first user input within the first region, accesses the context database to identify a first interface action (e.g., a page navigation action) as being associated with the first user input. The context translator, in response to sensing a second user input outside of an input region, accesses the context database to identify a second interface action (e.g., manipulating the volume, clicking on a link, scrolling within the content page) as being associated with the second user input.

At operation 1330, the navigation system 146 checks to see whether or not the context has changed. If the context has not changed, this ends the process at operation 1316 (for example, the user input was outside of the input region or if a user input within the input region is associated with the content page already being displayed). Conversely, if the navigation system 146 determines that the context has changed, the navigation system 146 continues to change the navigation icon. Referring back to FIG. 10, which illustrates operations for changing the appearance of a navigation icon based on the content page a user is viewing, the navigation system 146 accesses a graphics database in operation 1030. At operation 1040, the navigation system 146 identifies a graphic associated with the new contextual indicator (for example, the context that changed based on the user input). At operation 1050, the navigation system 146 changes the navigation icon to the identified graphic, which changes the appearance of the navigation icon. For example, the user swipes downwards using the navigation icon (e.g., displayed as a circle with a polka-dot texture) while viewing their settings page. The downwards swipe signifies a change in context navigating to the user's public photo album, so the system determines the context has changed, accesses data corresponding to graphic icons, and changes the navigation icon (e.g., to a circle with a striped texture).

Figure 14:
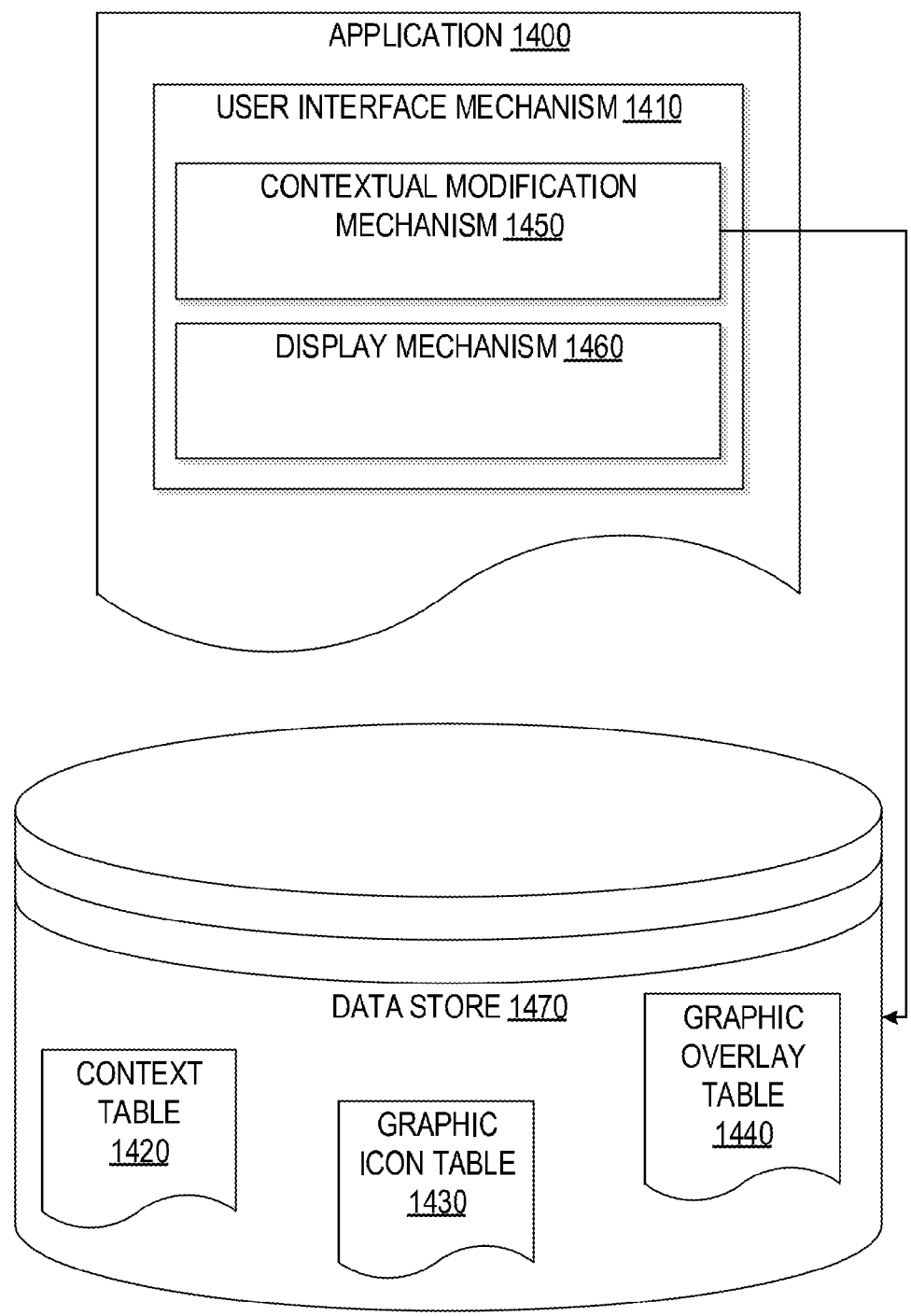
FIG. 14 is a data structure diagram illustrating a high-level data structure, according to an example embodiment, as implemented within an application.

Referring now to FIG. 14, an example high-level data structure is shown. Application 1400 (e.g., the VSCO® application, offered on ANDROID® and IPHONE®) contains a user interface mechanism 1410. The user interface mechanism 1410 contains a contextual modification mechanism 1450 as well as a display mechanism 1460. For example, the display mechanism 1460 is a liquid crystal display (LCD) capacitive touch screen or an organic light emitting diode (OLED) display. In various embodiments, the display mechanism displays the navigation node associated with a first user interface context as a first icon, and defines an input region inside which a user gesture actuates a navigation node. Contextual modification mechanism 1450 accesses a data store 1470 in order to display and modify the appearance of a navigation icon.

Stored within data store 1470, context table 1420 contains data representations of various user interface contexts (for example, the current page being displayed on a device and the associated navigation icon) as well as various contextual links (for example, links between certain content pages and their respective icon appearances, as well as links between user inputs and corresponding actions taken by the navigation system). Context table 1420 contains data linking a navigation icon with its associated content page, so that the user can determine which page is being viewed based on the appearance of the navigation icon. In some embodiments, each content page has an index, which matches the index of an image used as the associated icon. To determine which image is linked to a content page with a particular index (e.g., a string or integer value), the context translator searches through the context data to find the image with the same string or integer value.

Furthermore, in some embodiments the context table 1420 also contains data which associates a first user input with a first interface action, and a second user input with a second interface action. The data within context table 1420 is accessed by a context translator which accesses the context database in order to determine linked content pages, actions, and content page navigation icons. In various embodiments, every user input recognized by the navigation mechanism 146 and every possible action taken by the navigation mechanism (e.g., moving from one page to another) has an attribute value, and all attribute values are contained within the context database as context data so that the navigation mechanism 146 can identify specific user inputs which are linked to navigation actions. For example, context data includes data associating a user input with a corresponding action. In one embodiment, the context data comprises one or more strings or integers associated with each user input and each possible action the navigation system could complete, where paired user inputs and actions have the same string or integer. To determine which action is linked to a user input with a particular string or integer value, the context translator searches through the context data to find the action with the same string or integer value. In some embodiments, user inputs that are the same gesture (e.g., swiping to the left) but originate in different parts of the input interface (e.g., a screen) are stored within the context database as two separate user inputs.

Data store 1470 also contains one or more of the following: a graphic icon table 1430 and a graphic overlay table 1440. The graphic icon table is contained within a graphic icon database and contains icons which are to be displayed by the display mechanism 1460. Separate images are stored within graphic icon table 1430. In one example, each image stored within graphic icon table 1430 is a different shape. In another example, each image stored within graphic icon table 1430 is the same overall shape (e.g., a circle) but each image has one or more different colors. In such embodiments, color data is stored as one or more of the following: a hexadecimal color code, a decimal color code, RGB, or HSL. In yet another example, each image stored within graphic icon table 1430 is the same or a similar shape (e.g., a square) but each image has a different pattern or texture. Textures may include gradients, 3-D shading, and patterns such as stripes or dots.

The data store 1470 also contains a graphic overlay table 1440. Thus, graphic data including textures, shading, patterns, and gradients can be stored and overlaid over a base icon in order to change the appearance of the icon based on the content page the user is viewing. This may be done in lieu of, or in combination with, displaying a different base image for every content page a user views. The data store 1470 also contains a context database, containing contextual data associated with a user gesture including an associated icon and an associated action (e.g., a navigation action).

Figure 15:
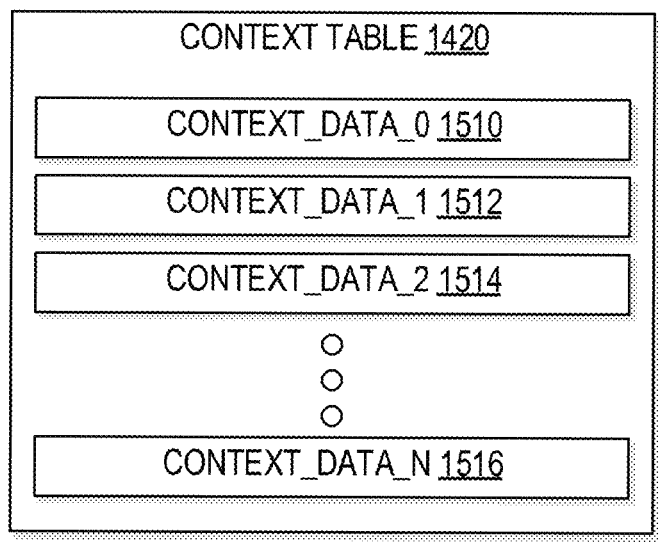
FIG. 15 is a data architecture diagram showing how data elements are arranged in some example embodiments.
Figure 15:
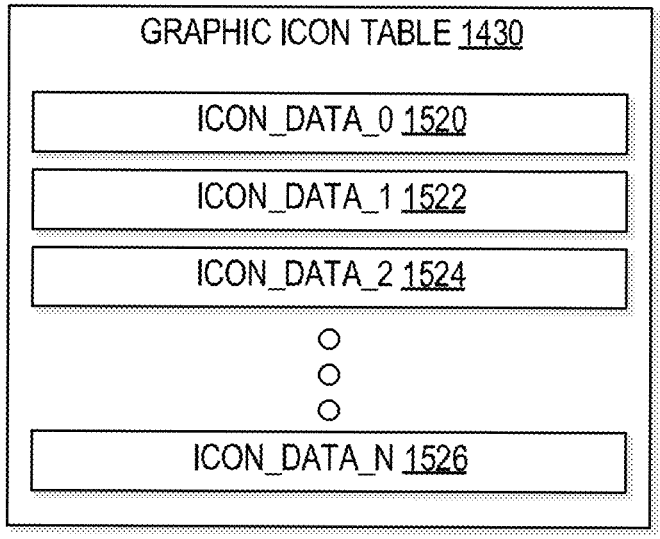

Referring now to FIG. 15, an example data architecture diagram 1500 is shown. Context table 1420, as described in FIG. 14, contains data segments CONTEXT_DATA_0 1510, CONTEXT_DATA_1 1512, CONTEXT_DATA_2 1514, up to CONTEXT_DATA_N 1516. In some embodiments, each data element within context table 1420 represents a specific content page within the application (e.g., a home page, user profile, photo editing page, messaging page, and the like). In other embodiments, each data element within context table 1420 represents the links between various content pages, navigation icons, and user inputs (e.g., a detected user input is linked to a content page and a navigation icon, so the navigation system 146 displays the linked content page and the navigation icon upon detecting the user input). Each data segment may be a single data element (e.g., an index) or an array containing multiple data elements. In embodiments where each data segment is an array containing multiple data elements, elements can include a content page name, a content page index, or an executable file location. Graphic icon table 1430, as described in FIG. 14, contains numerous data elements: ICON_DATA_0 1520, ICON_DATA_1 1522, ICON_DATA_2 1524, up to ICON_DATA_N 1526. In some embodiments, the graphic icon table 1430 contains image files. In other embodiments, the graphic icon table 1430 contains image file names or file paths.

Figure 16:
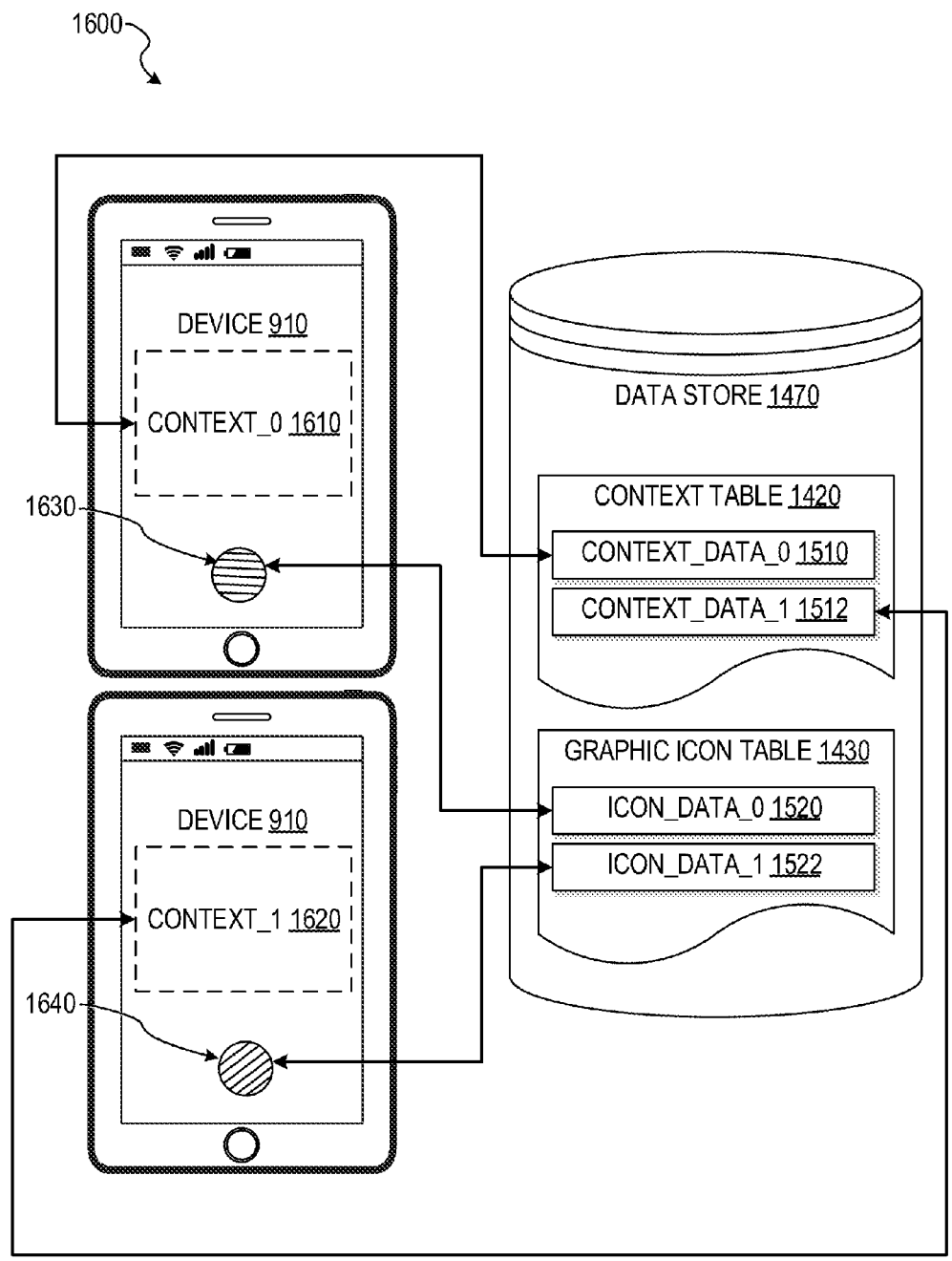
FIG. 16 is a schematic diagram showing the interrelationships between the context table and the graphic icon table.

FIG. 16 is an illustrative diagram 1600 showing the interrelationships between the context table 1420 and the graphic icon table 1430, both of which are stored in data store 1470 as described in FIG. 14. User device 910 is depicted twice on the left side of the diagram.

On the top left, device 910 is displaying content associated with a first context: CONTEXT_0 1610. This context is associated with data element CONTEXT_DATA_0 1510 from context table 1420, and also is associated with data element ICON_DATA_0 1520 from graphic icon table 1430. Based on the associated context and icon data, navigation icon 1630 is displayed on device 910.

On the bottom left, device 910 is displaying content associated with a second context: CONTEXT_1 1620. This second context is different from the first context, CONTEXT_0 1610. For example, if each context is a separate content page, the first context may be the home page of the application, while the second context is the user's profile. The second context is associated with data element CONTEXT_DATA_1 1512 from context table 1420, and also is associated with data element ICON_DATA_1 1522 from graphic icon table 1430. Based on the associated context and icon data, navigation icon 1640 is displayed on device 910. Thus, since the context is different in the two aforementioned cases, the navigation icon has a different appearance for each context in 1630 and 1640.

Figure 17:
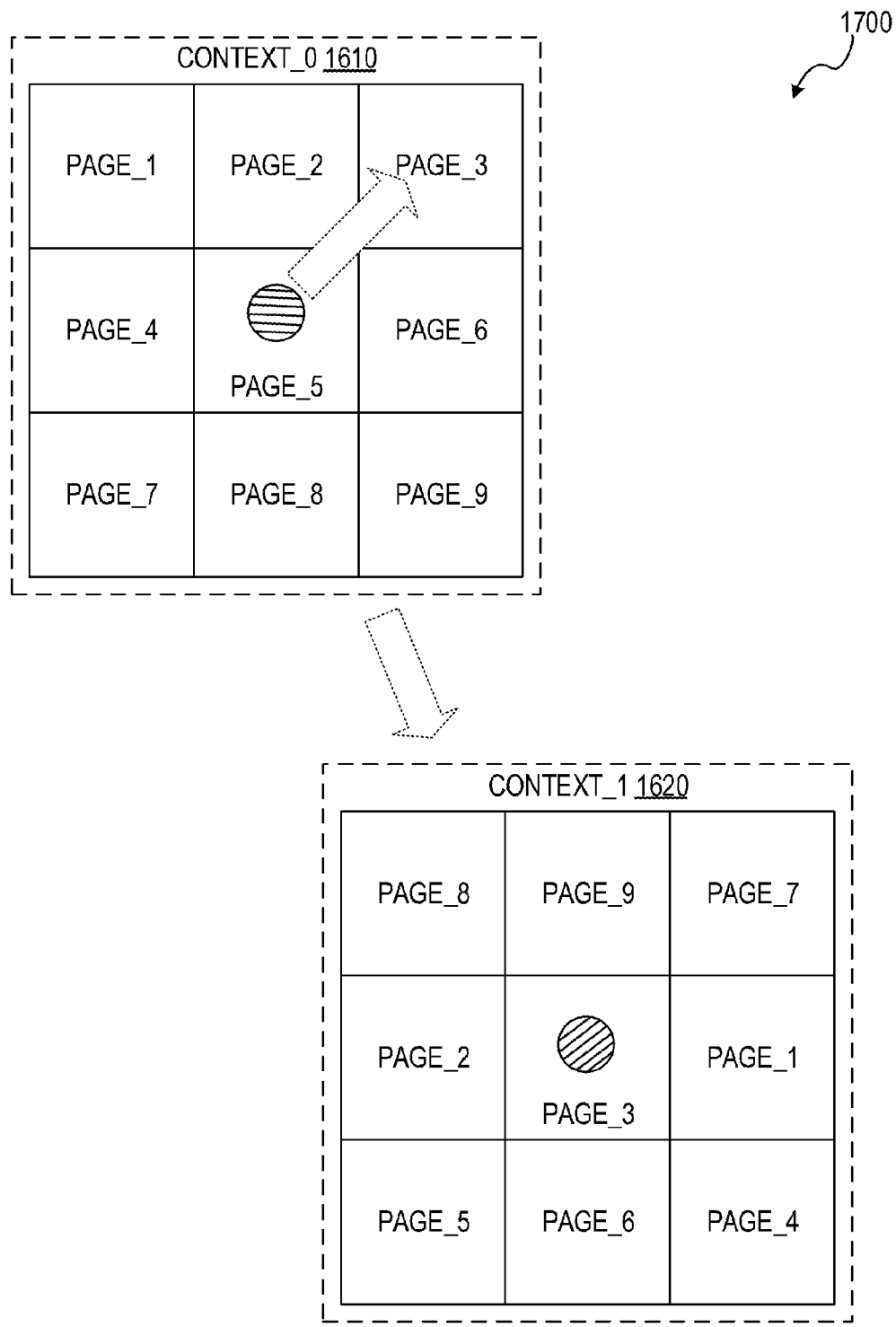
FIGS. 17-18 are schematic diagrams depicting how a system correlates directional user inputs with navigation actions from one content page to another content page.
Figure 18:
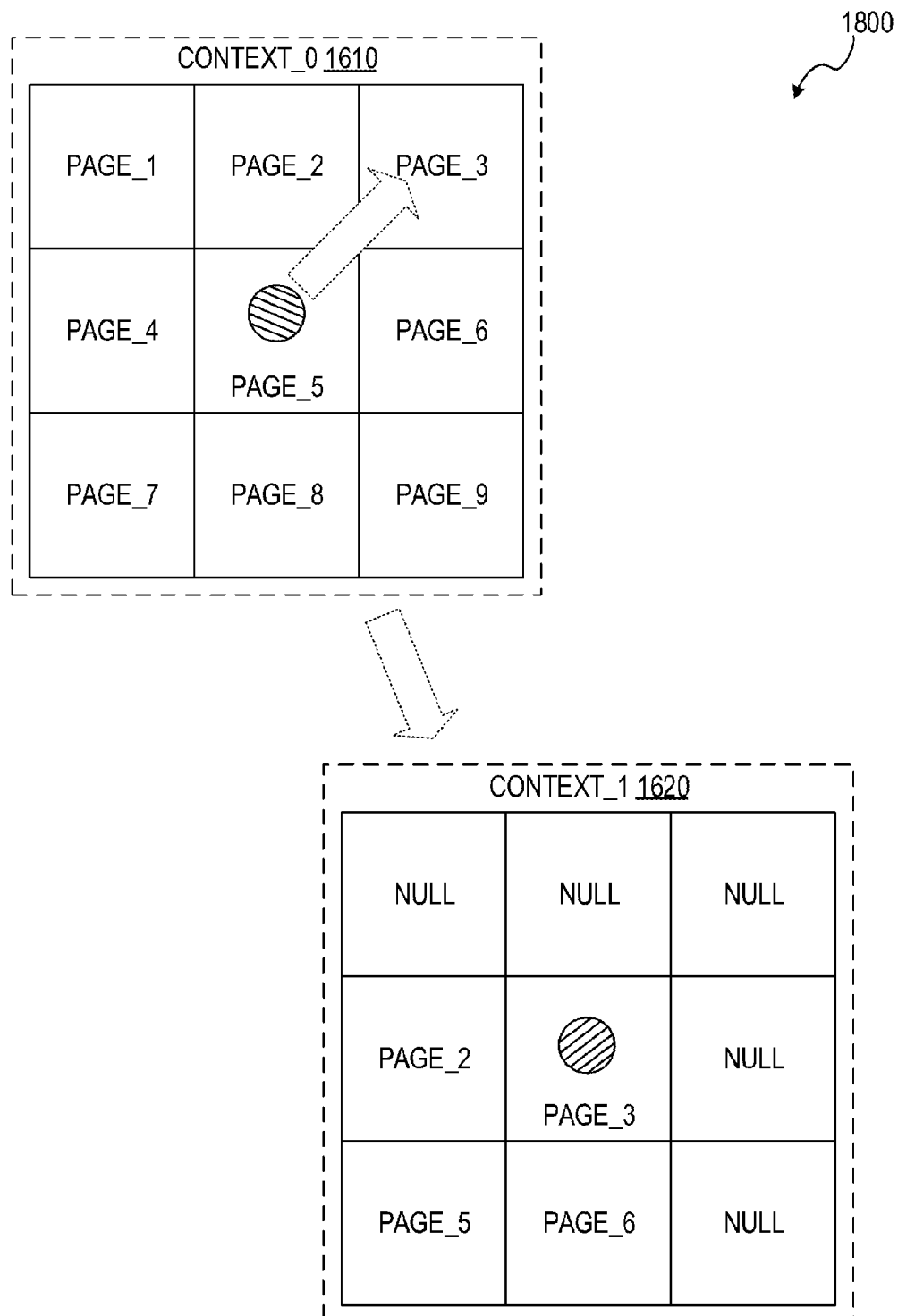

FIGS. 17-18 are two illustrative diagrams depicting how the system correlates directional user inputs with navigation between content pages. Referring now to FIG. 17, a navigation flow is depicted that allows for infinite scrolling. Once the user scrolls in a certain direction, the second content page, which is stored in that direction within a matrix, is selected and the system changes from a first content page to the second content page. To illustrate this scrolling functionality, FIG. 17 depicts example content pages in CONTEXT_0 1610 and CONTEXT_1 1620, as described in FIG. 16. In CONTEXT_0 1610, the user is viewing a page with the index 5 (e.g., a settings page), and the navigation mechanism is displayed as a circular icon with horizontal stripes. Once the user swipes diagonally to the top right, the system navigates to the page with the index 3, which is stored within that position in a two-dimensional matrix. This causes the system to transition to CONTEXT_1 1620, where the user is viewing the page with the index 3 (e.g., a curated content feed), and the navigation icon changes in appearance to a circular icon with diagonal stripes to denote the change in context.

FIG. 18 depicts a navigation flow using the navigation system 146 that does not allow for infinite scrolling, but instead has a boundary after which the user cannot scroll any further in a certain direction. To illustrate this scrolling functionality, FIG. 18 depicts example content pages in CONTEXT_0 1610 and CONTEXT_1 1620, as described in FIG. 16. In CONTEXT_0 1610, the user is viewing a page with the index 5 (e.g., a settings page), and the navigation mechanism is displayed as a circular icon with horizontal stripes. When the user scrolls in a certain direction, the second content page, which is stored in that direction within a matrix, is selected and the navigation system 146 changes from a first content page to the second content page. Once the user swipes diagonally to the top right, the navigation system 146 navigates to the page with the index 3, which is stored within that position in a two-dimensional matrix. This causes the navigation system 146 to transition to CONTEXT_1 1620, where the user is viewing the page with the index 3 (e.g., a curated content feed), and the navigation icon changes in appearance to a circular icon with diagonal stripes. However, the user cannot scroll diagonally to the top right again, because those spots in the data structure are not repopulated by other values. This can be depicted, in various embodiments, as null values in a two-dimensional matrix. In some example embodiments, a user who attempts to scroll in a direction with an associated null value will be notified that the navigation action was unsuccessful through haptic feedback or a visual indicator on the display of the device.

In another example embodiment, specific user gestures are associated with specific content pages, so the navigation system 146 navigates to the same content page each time a specific user gesture is detected within the input region. For example, double-tapping within the input region always causes the navigation system 146 to navigate to a homepage, swiping upwards always causes the navigation system 146 to navigate to a settings page, or swiping downwards always causes the navigation system 146 to navigate to the user's profile page. For each of these navigation actions, if the context changes (e.g., if the system detects a change from one content page to another page), the contextual appearance mechanism 148 will change the appearance of the navigation icon as described in FIG. 11.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-18 are implemented in some embodiments in the context of a machine and an associated software architecture. The sections below describe representative software architecture and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, and the like. A slightly different hardware and software architecture may yield a smart device for use in the "internet of things." Yet another combination produces a server computer for use within a cloud computing architecture. Not all combinations of such software and hardware architectures are presented here as those of skill in the art can readily understand how to implement the inventive subject matter in different contexts from the disclosure contained herein.

Figure 19:
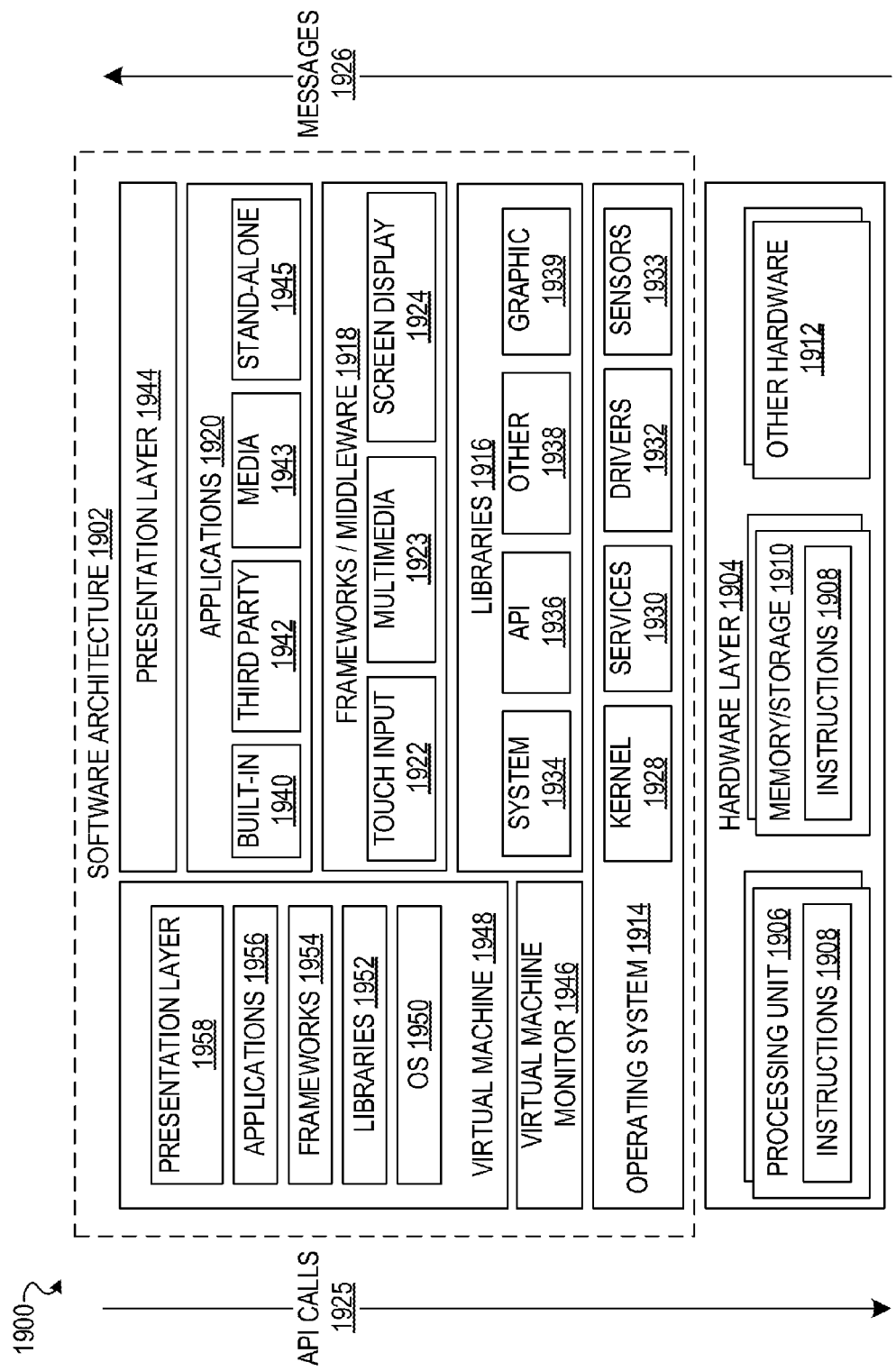
FIG. 19 is a block diagram illustrating an example of a software architecture that may be installed on a machine, according to some example embodiments.

FIG. 19 is a block diagram 1900 illustrating a representative software architecture 1902, which may be used in conjunction with various hardware architectures herein described. FIG. 19 is merely a non-limiting example of a software architecture and it will be appreciated that many other architectures may be implemented to facilitate the functionality described herein. The software architecture 1902 may be executing on hardware such as machine 2000 of FIG. 20 that includes, among other things, processors 2010, memory/storage 2030, and I/O components 2050. A representative hardware layer 1904 is illustrated and can represent, for example, the machine 2000 of FIG. 20. The representative hardware layer 1904 comprises one or more processing units 1906 having associated executable instructions 1908. Executable instructions 1908 represent the executable instructions of the software architecture 1902, including implementation of the methods, modules and so forth of FIGS. 1-18. Hardware layer 1904 also includes memory and storage modules 1910, which also have executable instructions 1908. Hardware layer 1904 may also comprise other hardware 1912, which represents any other hardware of the hardware layer 1904, such as the other hardware illustrated as part of machine 2000.

In the example architecture of FIG. 19, the software architecture 1902 may be conceptualized as a stack of layers where each layer provides particular functionality. For example, the software architecture 1902 may include layers such as an operating system 1914, libraries 1916, frameworks/middleware 1918, applications 1920, and presentation layer 1944. Operationally, the applications 1920 or other components within the layers may invoke API calls 1925 through the software stack and receive a response, returned values, and so forth illustrated as messages 1926 in response to the API calls 1924. The layers illustrated are representative in nature and not all software architectures have all layers. For example, some mobile or special purpose operating systems may not provide the frameworks/middleware 1918, while others may provide such a layer. Other software architectures may include additional or different layers.

The operating system 1914 may manage hardware resources and provide common services. The operating system 1914 may include, for example, a kernel 1928, services 1930, and drivers 1932. The kernel 1928 may act as an abstraction layer between the hardware and the other software layers. For example, the kernel 1928 may be responsible for memory management, processor management (e.g., scheduling), component management, networking, security settings, and so on. The services 1930 may provide other common services for the other software layers. The drivers 1932 may be responsible for controlling or interfacing with the underlying hardware. For instance, the drivers 1932 may include display drivers, camera drivers, BLUETOOTH® drivers, flash memory drivers, serial communication drivers (e.g., Universal Serial Bus (USB) drivers), WI-FI® drivers, audio drivers, power management drivers, and so forth depending on the hardware configuration. In an example embodiment, the operating system 1914 includes input service 1933 that can provide various input processing services such as low-level access to touchscreen input data or other user input data.

The libraries 1916 may provide a common infrastructure that may be utilized by the applications 1920 or other components or layers. The libraries 1916 typically provide functionality that allows other software modules to perform tasks in an easier fashion than to interface directly with the underlying operating system 1914 functionality (e.g., kernel 1928, services 1930, or drivers 1932). The libraries 1916 may include system libraries 1934 (e.g., C standard library) that may provide functions such as memory allocation functions, string manipulation functions, mathematic functions, and the like. In addition, the libraries 1916 may include API libraries 1936 such as media libraries (e.g., libraries to support presentation and manipulation of various media format such as MPREG4, H.264, MP3, AAC, AMR, JPG, or PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1916 may also include a wide variety of other libraries 1938 to provide many other APIs to the applications 1920 and other software components/modules. In an example embodiment, the libraries 1916 include input libraries 1939 that provide input tracking, capture, or otherwise monitor user input such as touchscreen input that can be utilized by the navigation system 146.

The frameworks/middleware 1918 (also sometimes referred to as middleware) may provide a higher-level common infrastructure that may be utilized by the applications 1920 or other software components/modules. For example, the frameworks/middleware 1918 may provide various graphic user interface (GUI) functions, high-level resource management, high-level location services, and so forth. The frameworks/middleware 1918 may provide a broad spectrum of other APIs that may be utilized by the applications 1920 or other software components/modules, some of which may be specific to a particular operating system or platform. In an example embodiment, the frameworks/middleware 1918 include an image touch input framework 1922 and a multimedia framework 1923. The touch input framework 1922 can provide high-level support for touch input functions that can be used in aspects of the navigation system 146. For example, the touch input framework 1922 allows the navigation system 146 to detect one or more user inputs and differentiate between different types of user inputs (e.g., pressing and holding, swiping upwards, etc.). Similarly, the multimedia framework 1923 can provide high-level support for image and video support, as well as the display of animations (e.g., animating the navigation icon).

The applications 1920 include built-in applications 1940 or third party applications 1942. Examples of representative built-in applications 1940 may include, but are not limited to, a contacts application, a picture editing and sharing application, a browser application, a book reader application, a location application, a media application, a messaging application, or a game application. Third party applications 1942 may include any of the built-in applications as well as a broad assortment of other applications. In a specific example, the third party application 1942 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or other mobile operating systems. In this example, the third party application 1942 may invoke the API calls 1925 provided by the mobile operating system such as operating system 1914 to facilitate functionality described herein. In an example embodiment, the applications 1920 include a media application 1943 that includes the navigation system 146 as part of the application. In another example embodiment, the applications 1920 include a stand-alone application 1945 that includes the navigation system 146.

The applications 1920 may utilize built-in operating system functions (e.g., kernel 1928, services 1930, or drivers 1932), libraries (e.g., system libraries 1934, API libraries 1936, and other libraries 1938), and frameworks/middleware 1918 to create user interfaces to interact with users of the system. Alternatively, or additionally, in some systems, interactions with a user may occur through a presentation layer, such as presentation layer 1944. In these systems, the application/module "logic" can be separated from the aspects of the application/module that interact with a user.

Some software architectures utilize virtual machines. In the example of FIG. 19, this is illustrated by virtual machine 1948. A virtual machine creates a software environment where applications/modules can execute as if they were executing on a hardware machine (such as the machine 2000 of FIG. 20, for example). The virtual machine 1948 is hosted by a host operating system (operating system 1914 in FIG. 20) and typically, although not always, has a virtual machine monitor 1946, which manages the operation of the virtual machine 1948 as well as the interface with the host operating system (i.e., operating system 1914). A software architecture executes within the virtual machine 1948, such as an operating system 1950, libraries 1952, frameworks/middleware 1954, applications 1956, or presentation layer 1958. These layers of software architecture executing within the virtual machine 1948 can be the same as corresponding layers previously described or may be different.

Figure 20:
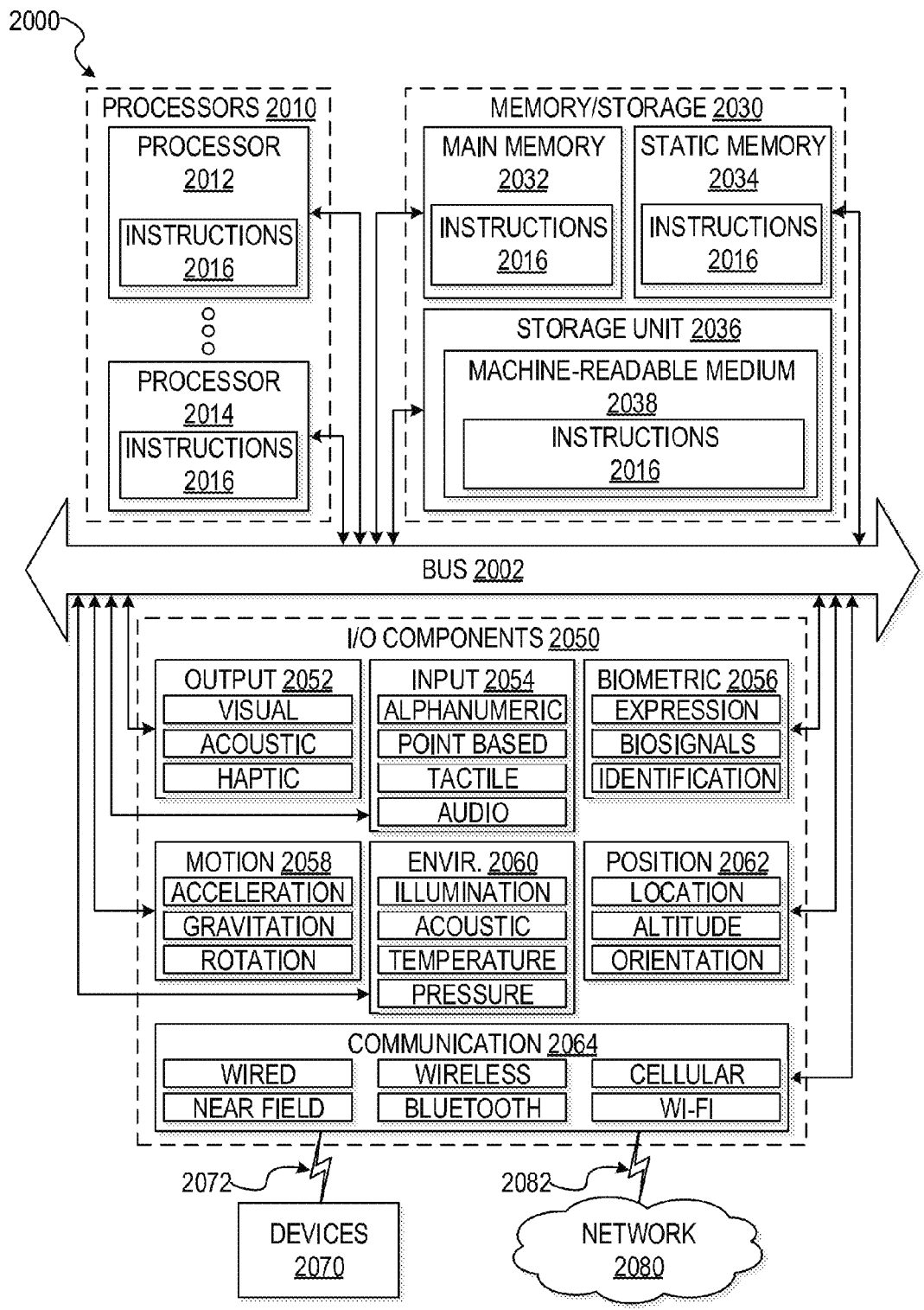
FIG. 20 illustrates a diagrammatic representation of a machine in the form of a computer system within which a set of instructions may be executed for causing the machine to perform any one or more of the methodologies discussed herein, according to an example embodiment.

FIG. 20 is a block diagram illustrating components of a machine 2000, according to some example embodiments, able to read instructions from a machine-readable medium 2038 (e.g., a machine-readable storage medium) and perform any one or more of the methodologies discussed herein. Specifically, FIG. 20 shows a diagrammatic representation of the machine 2000 in the example form of a computer system, within which instructions 2016 (e.g., software, a program, an application, an applet, an app, or other executable code) for causing the machine 2000 to perform any one or more of the methodologies discussed herein can be executed. For example, the instructions 2016 can cause the machine 2000 to execute the flow diagrams of FIGS. 1-18. The instructions 2016 transform the general, non-programmed machine into a particular machine programmed to carry out the described and illustrated functions in the manner described. In alternative embodiments, the machine 2000 operates as a standalone device or can be coupled (e.g., networked) to other machines. In a networked deployment, the machine 2000 may operate in the capacity of a server machine or a client machine in a server-client network environment, or as a peer machine in a peer-to-peer (or distributed) network environment. The machine 2000 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2016, sequentially or otherwise, that specify actions to be taken by the machine 2000. Further, while only a single machine 2000 is illustrated, the term "machine" shall also be taken to include a collection of machines 2000 that individually or jointly execute the instructions 2016 to perform any one or more of the methodologies discussed herein.

The machine 2000 can include processors 2010, memory/storage 2030, and I/O components 2050, which can be configured to communicate with each other such as via a bus 2002. In an example embodiment, the processors 2010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, processor 2012 and processor 2014 that may execute instructions 2016. The term "processor" is intended to include multi-core processor that may comprise two or more independent processors (sometimes referred to as "cores") that can execute instructions contemporaneously. Although FIG. 20 shows multiple processors 2010, the machine 2000 may include a single processor with a single core, a single processor with multiple cores (e.g., a multi-core processor), multiple processors with a single core, multiple processors with multiples cores, or any combination thereof.

The memory/storage 2030 can include a main memory 2032, a static memory 2034, or other memory storage, and a storage unit 2036, all accessible to the processors 2010 such as via the bus 2002. The memory 2032 stores the instructions 2016 embodying any one or more of the methodologies or functions described herein. The storage unit 2036 also stores the instructions 2016 within a machine readable medium 2038, embodying any one or more of the methodologies or functions described herein. The instructions 2016 can also reside, completely or partially, within the memory 2032, within the storage unit 2036, within at least one of the processors 2010 (e.g., within the processor's cache memory), or any suitable combination thereof, during execution thereof by the machine 2000. Accordingly, the memory 2032, the storage unit 2036, and the memory of the processors 2010 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 2016. The term "machine-readable medium" shall also be taken to include any medium, or combination of multiple media, that is capable of storing instructions (e.g., instructions 2016) for execution by a machine (e.g., machine 2000), such that the instructions, when executed by one or more processors of the machine 2000 (e.g., processors 2010), cause the machine 2000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2050 can include a wide variety of components to receive input, provide output, produce output, transmit information, exchange information, capture measurements, and so on. The specific I/O components 2050 that are included in a particular machine will depend on the type of machine. For example, portable machines such as mobile phones will likely include a touch input device or other such input mechanisms, while a headless server machine will likely not include such a touch input device. It will be appreciated that the I/O components 2050 can include many other components that are not shown in FIG. 20. The I/O components 2050 are grouped according to functionality merely for simplifying the following discussion, and the grouping is in no way limiting. In various example embodiments, the I/O components 2050 can include output components 2052 and input components 2054. The output components 2052 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2054 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 2050 can include biometric components 2056, motion components 2058, environmental components 2060, or position components 2062 among a wide array of other components. For example, the biometric components 2056 can include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram based identification), and the like. The motion components 2058 can include acceleration sensor components (e.g., an accelerometer), gravitation sensor components, rotation sensor components (e.g., a gyroscope), and so forth. The environmental components 2060 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 2062 can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 2050 may include communication components 2064 operable to couple the machine 2000 to a network 2080 or devices 2070 via a coupling 2082 and a coupling 2072, respectively. For example, the communication components 2064 include a network interface component or other suitable device to interface with the network 2080. In further examples, communication components 2064 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 2070 may be another machine or any of a wide variety of peripheral devices (e.g., a peripheral device coupled via a Universal Serial Bus (USB)).

Moreover, the communication components 2064 can detect identifiers or include components operable to detect identifiers. For example, the communication components 2064 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 2064, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 2080 can be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a WI-FI® network, another type of network, or a combination of two or more such networks. For example, the network 2080 or a portion of the network 2080 may include a wireless or cellular network, and the coupling 2082 may be a Code Division Multiple Access (CDMA) connection, a Global System for Mobile communications (GSM) connection, or other type of cellular or wireless coupling. In this example, the coupling 2082 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2016 can be transmitted or received over the network 2080 using a transmission medium via a network interface device (e.g., a network interface component included in the communication components 2064) and utilizing any one of a number of well-known transfer protocols (e.g., HTTP). Similarly, the instructions 2016 can be transmitted or received using a transmission medium via the coupling 2072 (e.g., a peer-to-peer coupling) to devices 2070. The term "transmission medium" shall be taken to include any intangible medium that is capable of storing, encoding, or carrying the instructions 2016 for execution by the machine 2000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer system, comprising:
   a processor;
   a touchscreen display; and
   a memory device holding a content database, a graphics database, and an instruction set executable on the processor to cause the computer system to perform operations comprising:
      displaying a content page and a navigation icon;
      defining a first input region as an area of the displayed navigation icon and a second input region as an area outside of the displayed navigation icon;
      receiving a first pre-defined user touch gesture beginning in the first input region or the second input region;
      in response to determining that the received gesture began in the first input region:
         accessing the content database to identify context change data that corresponds with a first operation defining navigation to a specific content page and to further access the graphics database to identify a respective navigation icon assigned for display in the specific content page,
         triggering the first operation to navigate to the specific content page, and
         replacing display of the displayed navigation icon with the respective navigation icon; and
      in response to determining that the received gesture began in the second input region:
         accessing the content database to identify context change data that corresponds with a second operation defining modification of content of the currently displayed content page, and
         triggering the second operation to modify the content of the currently displayed content page;
      wherein the context database contains context change data that associates respective pre-defined user touch gestures with corresponding operations, the graphics database being interrelated with the context database with respect to the context change data, the graphics database containing a plurality of different navigation icons, including the displayed navigation icon, exactly one icon being assigned for display on each different, respective content pages.

2. The computer system of claim 1, wherein the first operation can be defined for one of the following: a content page, a search page and a user profile page.

3. The computer system of claim 1, wherein the second operation can be defined as one of the following: an image manipulation, a scroll action, a volume control and a zoom manipulation.

4. The computer system of claim 1, wherein the first pre-defined user touch gesture comprises a user double-tapping physical gesture.

5. The computer system of claim 1, wherein sensing the respective instances of the first pre-defined user touch gesture occurs while the currently displayed content page is displayed independently from the displayed navigation icon, the currently displayed content page different than the specific content page.

6. The computer system of claim 1, wherein the first pre-defined user touch gesture comprises a user finger swiping physical gesture.

7. The computer system of claim 1, wherein a display position of the navigation icon is modifiable.

8. A method performed by a computing device comprising a processor, a memory device storing a context database and a graphics database, and a touch screen, the method comprising:
   displaying a content page and a navigation icon;
   defining a first input region as an area of the displayed navigation icon and a second input region as an area outside of the displayed navigation icon;
   receiving a first pre-defined user touch gesture beginning in the first input region or the second input region;
   in response to determining that the received gesture began in the first input region:
      accessing the content database to identify context change data that corresponds with a first operation defining navigation to a specific content page and to further access the graphics database to identify a respective navigation icon assigned for display in the specific content page,
      triggering the first operation to navigate to the specific content page, and
      replacing display of the displayed navigation icon with the respective navigation icon; and
   in response to determining that the received gesture began in the second input region:
      accessing the content database to identify context change data that corresponds with a second operation defining modification of content of the currently displayed content page, and
      triggering the second operation to modify the content of the currently displayed content page;
   wherein context database contains context change data that associates respective pre-defined user touch gestures with corresponding operations, the graphics database being interrelated with the context database with respect to the context change data, the graphics database containing a plurality of different navigation icons, including the displayed navigation icon, exactly one icon being assigned for display on each different, respective content pages.

9. The method of claim 8, wherein the first operation can be defined for one of the following: a content page, a search page and a user profile page.

10. The method of claim 8, wherein the second operation can be defined as one of the following: an image manipulation, a scroll action, a volume control and a zoom manipulation.

11. The method of claim 8, wherein the first pre-defined user touch gesture comprises a user double-tapping physical gesture.

12. The method of claim 8, wherein sensing the respective instances of the first pre-defined user touch gesture occurs while the currently displayed content page is displayed independently from the displayed navigation icon, the currently displayed content page different than the specific content page.

13. The method of claim 8, wherein the first pre-defined user touch gesture comprises a user finger swiping physical gesture.

14. The method of claim 8, wherein a display position of the navigation icon is modifiable.

15. A non-transitory computer-readable medium storing a context database, a graphics database, and executable instructions, the executable instruction, when executed by a processor of a device with a touch screen, causing the device to perform operations comprising:

displaying a content page and a navigation icon;

defining a first input region as an area of the displayed navigation icon and a second input region as an area outside of the displayed navigation icon;

receiving a first pre-defined user touch gesture beginning in the first input region or the second input region;

in response to determining that the received gesture began in the first input region:

accessing the content database to identify context change data that corresponds with a first operation defining navigation to a specific content page and to further access the graphics database to identify a respective navigation icon assigned for display in the specific content page, triggering the first operation to navigate to the specific content page, and replacing display of the displayed navigation icon with the respective navigation icon; and in response to determining that the received gesture began in the second input region:

accessing the content database to identify context change data that corresponds with a second operation defining modification of content of the currently displayed content page, and triggering the second operation to modify the content of the currently displayed content page;

wherein the context database contains context change data that associates respective pre-defined user touch gestures with corresponding operations, the graphics database being interrelated with the context database with respect to the context change data, the graphics database containing a plurality of different navigation icons, including the displayed navigation icon, exactly one icon being assigned for display on each different, respective content pages.

16. The non-transitory computer-readable medium of claim 15, wherein the first operation can be defined for one of the following: a content page, a search page and a user profile page.

17. The non-transitory computer-readable medium of claim 15, wherein the second operation can be defined as one of the following: an image manipulation, a scroll action, a volume control and a zoom manipulation.

18. The non-transitory computer-readable medium of claim 15, wherein the first pre-defined user touch gesture comprises a user double-tapping physical gesture.

19. The non-transitory computer-readable medium of claim 15, wherein sensing the respective instances of the first pre-defined user touch gesture occurs while the currently displayed content page is displayed independently from the displayed navigation icon, the currently displayed content page different than the specific content page.

20. The non-transitory computer-readable medium of claim 15, wherein the first pre-defined user touch gesture comprises a user finger swiping physical gesture.

* * * * *

UNITED STATES PATENT AND TRADEMARK OFFICE
CERTIFICATE OF CORRECTION

PATENT NO. : 9,910,563 B2
APPLICATION NO. : 15/010687
DATED : March 6, 2018
INVENTOR(S) : Wu et al.

It is certified that error appears in the above-identified patent and that said Letters Patent is hereby corrected as shown below:

In the Claims

In Column 26, Line 59, in Claim 8, after "wherein", insert --the--

Signed and Sealed this
Eighteenth Day of June, 2019

Andrei Iancu
*Director of the United States Patent and Trademark Office*